US010922860B2

(12) United States Patent
Price et al.

(10) Patent No.: US 10,922,860 B2
(45) Date of Patent: Feb. 16, 2021

(54) LINE DRAWING GENERATION

(71) Applicant: Adobe Inc., San Jose, CA (US)

(72) Inventors: Brian Price, San Jose, CA (US); Ning Xu, Mountain View, CA (US); Naoto Inoue, Kanagawa (JP); Jimei Yang, Mountain View, CA (US); Daicho Ito, San Jose, CA (US)

(73) Assignee: Adobe Inc., San Jose, CA (US)

( * ) Notice: Subject to any disclaimer, the term of this patent is extended or adjusted under 35 U.S.C. 154(b) by 0 days.

(21) Appl. No.: 16/410,854

(22) Filed: May 13, 2019

(65) Prior Publication Data

US 2020/0364910 A1 Nov. 19, 2020

(51) Int. Cl.
*G06T 11/20* (2006.01)
*G06K 9/46* (2006.01)
(Continued)

(52) U.S. Cl.
CPC .......... *G06T 11/203* (2013.01); *G06K 9/4609* (2013.01); *G06K 9/6256* (2013.01); *G06T 5/002* (2013.01); *G06T 7/40* (2013.01); *G06T 2207/20081* (2013.01); *G06T 2207/20084* (2013.01); *G06T 2207/30184* (2013.01); *G06T 2207/30196* (2013.01)

(58) Field of Classification Search
None
See application file for complete search history.

(56) References Cited

U.S. PATENT DOCUMENTS

2017/0287137 A1* 10/2017 Lin ........................ G06N 3/08
2019/0259134 A1* 8/2019 Rainy .................. G06N 3/0454

FOREIGN PATENT DOCUMENTS

CN 107403201 A * 11/2017

OTHER PUBLICATIONS

Yang, Jimei, Brian Price, Scott Cohen, Honglak Lee, and Ming-Hsuan Yang. "Object contour detection with a fully convolutional encoder-decoder network." In Proceedings of the IEEE conference on computer vision and pattern recognition, pp. 193-202. 2016. (Year: 2016).*

(Continued)

*Primary Examiner* — Steven Z Elbinger
(74) *Attorney, Agent, or Firm* — Kilpatrick Townsend & Stockton LLP

(57) ABSTRACT

Computing systems and computer-implemented methods can be used for automatically generating a digital line drawing of the contents of a photograph. In various examples, these techniques include use of a neural network, referred to as a generator network, that is trained on a dataset of photographs and human-generated line drawings of the photographs. The training data set teaches the neural network to trace the edges and features of objects in the photographs, as well as which edges or features can be ignored. The output of the generator network is a two-tone digital image, where the background of the image is one tone, and the contents in the input photographs are represented by lines drawn in the second tone. In some examples, a second neural network, referred to as a restorer network, can further process the output of the generator network, and remove visual artifacts and clean up the lines.

20 Claims, 17 Drawing Sheets
(8 of 17 Drawing Sheet(s) Filed in Color)

(51) Int. Cl.
G06K 9/62 (2006.01)
G06T 7/40 (2017.01)
G06T 5/00 (2006.01)

(56) References Cited

OTHER PUBLICATIONS

Sasaki, Kazuma, Satoshi Iizuka, Edgar Simo-Serra, and Hiroshi Ishikawa. "Learning to restore deteriorated line drawing." The Visual Computer 34, No. 6-8 (2018): 1077-1085. (Year: 2018).*
Edgar Simo-Serra et al. "Real-Time Data-Driven Interactive Rough Sketch Inking." ACM Trans. Graph.37, 4, Article 98 (Aug. 2018), 14 pages. https://doi.org/10.1145/3197517.3201370.
David Ha et al. "A Neural Representation of Sketch Drawings." 2018.16 pages.
Byungsoo Kim et al. "Semantic Segmentation for Line Drawing Vectorization Using Neural Networks." Eurographics. vol. 37 (2018), No. 2, 10 pages.
Jimei Yang et al. 2016. "Object contour detection with a fully convolutional encoder-decoder network." In Proceedings of the IEEE Conference on Computer Vision and Pattern Recognition. pp. 193-202.
Saining Xie et al. 2015. "Holistically-nested edge detection." In Proceedings of the IEEE international conference on computer vision. pp. 1395-1403.
Ren Xiaofeng et al. 2012. "Discriminatively trained sparse code gradients for contour detection." In Advances in neural information processing systems. Intel Science and Technology Center for Pervasive Computing. pp. 584-592.
Yupei Wang et al. 2017. "Deep Crisp Boundaries." In Proceedings of the IEEE Conference on Computer Vision and Pattern Recognition. pp. 3892-3900.
Jonathan Tompson et al. 2015. "Efficient object localization using convolutional networks." In Proceedings of the IEEE Conference on Computer Vision and Pattern Recognition. pp. 648-656.
David R. Martin et al. 2004."Learning to detect natural image boundaries using local brightness, color, and texture cues." IEEE transactions on pattern analysis and machine intelligence 26, 5 (2004), pp. 530-549.
Vinod Nair et al. 2010. "Rectified linear units improve restricted boltzmann machines." In Proceedings of the 27th international conference on machine learning (ICML-10). pp. 807-814.
Gioacchino Noris et al. 2013. "Topology-driven vectorization of clean line drawings." ACM Transactions on Graphics (TOG) 32, 1, 4.
Gunay Orbay et al. 2011. "Beautification of design sketches using trainable stroke clustering and curve fitting." IEEE Transactions on Visualization and Computer Graphics 17, 5 (2011), pp. 694-708.
Kazuma Sasaki et al. 2018. "Learning to Restore Deteriorated Line Drawing." The Visual Computer (Proc. of Computer Graphics International 2018) 34, 6-8 (2018), pp. 1077-1085.
Jiazhou Chen et al. 2013. "Non-Oriented MLS Gradient Fields." In Computer Graphics Forum, vol. 32. Wiley Online Library, pp. 98-109.
Edgar Simo-Serra et al. 2016. Learning to simplify: fully convolutional networks for rough sketch cleanup. ACM Transactions on Graphics (TOG) 35, 4, 121.
Edgar Simo-Serra et al. 2018. "Real-time data-driven interactive rough sketch inking." ACM Transactions on Graphics (TOG) 37, 4, 98.
Edgar Simo-Serra et al. 2018. "Mastering sketching:adversarial augmentation for structured prediction." ACM Transactions on Graphics (TOG) 37, 1 (2018), 11.
Amit Shesh et al. 2008. "Efficient and dynamic simplification of line drawings." In Computer Graphics Forum, vol. 27. Wiley Online Library, pp. 537-545.
Xiaoyong Shen et al. 2016. "Automatic portrait segmentation for image stylization." In Computer Graphics Forum, vol. 35. Wiley Online Library, pp. 93-102.
Xueting Liu et al. 2015. "Closure-aware sketch simplification." ACM Transactions on Graphics (TOG) 34, 6, 168.
Leon A Gatys et al. 2016. "Image style transfer using convolutional neural networks." In Proceedings of the IEEE Conference on Computer Vision and Pattern Recognition. pp. 2414-2423.
Vuong Le et al. 2012. "Interactive facial feature localization." In European conference on computer vision. Springer, pp. 679-692.
Justin Johnson et al. 2016. "Perceptual losses for real-time style transfer and super-resolution." In European Conference on Computer Vision. Springer, 694-711.
Kota Ito et al. 2015. "Separation of Manga Line Drawings and Screentones." In Eurographics (Short Papers). pp. 73-76.
Phillip Isola et al. 2017. "Image-to-image translation with conditional adversarial networks." In Proceedings of the IEEE Conference on Computer Vision and Pattern Recognition.
Sergey Ioffe et al. 2015. "Batch Normalization: Accelerating Deep Network Training by Reducing Internal Covariate Shift." In International Conference on Machine Learning. pp. 448-456.
Kaiming He et al. 2016. "Deep residual learning for image recognition." In Proceedings of the IEEE conference on computer vision and pattern recognition. pp. 770-778.
Jia Deng et al. 2009. Imagenet: "A large-scale hierarchical image database." In Computer Vision and Pattern Recognition, (2009). IEEE Conference pp. 248-255.
Pablo Arbelaez et al. 2011. "Contour detection and hierarchical image segmentation." IEEE transactions on pattern analysis and machine intelligence 33, 5 (2011), pp. 898-916.
Pierre Bénard et al. 2018. "Line Drawings from 3D Models." arXiv preprint arXiv:1810.01175 (2018).
John Canny. 1986. "A computational approach to edge detection." IEEE Transactions on pattern analysis and machine intelligence 6, pp. 679-698.
Forrester Cole. 2008. "Where do people draw lines?" In ACM Transactions on Graphics (TOG), vol. 27. ACM, 88.
Piotr Dollár et al. 2013. "Structured forests for fast edge detection." In Proceedings of the IEEE International Conference on Computer Vision. pp. 1841-1848.
Piotr Dollár et al. 2006. "Supervised learning of edges and object boundaries." In Computer Vision and Pattern Recognition, 2006 IEEE Computer Society Conference on, vol. 2. IEEE, pp. 1964-1971.
Richard O Duda et al. 1973. "Pattern classification and scene analysis." A Wiley-Interscience Publication, New York: Wiley, 1973; pp. 263-465.
Jean-Dominique Favreau et al. 2016. "Fidelity vs. simplicity: a global approach to line drawing vectorization." ACM Transactions on Graphics (TOG) 35, 4, 120.
Byungsoo Kim et al. "Semantic Segmentation for Line Drawing Vectorization Using Neural Networks." 2018. Eurographics. vol. 37, (2), retrieved on Oct. 25, 2019 http://www.byungsoo.me/project/vectornet/paper.pdf.
David Ha et al. "A Neural Representation of Sketch Drawings." 2018. Conference paper at ICLR. retrieved on Oct. 25, 2019 from https://openreview.net/pdf?id=Hy6GHpkCW.
Leon A. Gatys et al."A Neural Algorithm of Artistic Style." Sep. 2, 2015. arXiv:1508.06576v2. 16 pages.
Anonymous Authors. "Learning to Trace: Expressive Line Drawing Generation From Photographs." ACM Trans. Graph., vol. 1, No. 1, Jan. 2019. 12 pages.
Alex Krizhevsky et al. "ImageNet Classification with Deep Convolutional Neural Networks." In Advances in neural information processing systems. 2012. pp. 1097-1105.
Julien Mairal et al. Discriminative Sparse Image Models for Classic-Specific Edge Detection and Image Interpretation. Oct. 2008. 14 pages.
Ian J. Goodfellow et al. "Generative Adversarial Nets." Jun. 10, 2014. arXiv:1406.2661v1. 9 pages.
Yijun Li et al. "Universal Style Transfer via Feature Transforms." Nov. 17, 2017. Advances in Neural Information Processing Systems 30. 11 pages.
Diederik P. Kingma et al., "Adam: a Method for Stochastic Optimization." Jan. 30, 2017. arXiv:1412.6980v9. 26 pages.

(56) References Cited

OTHER PUBLICATIONS

Alex Krizhevsky et al. 2012. "ImageNet Classification with Deep Convolutional Neural Networks." In Advances in neural information processing systems. pp. 1097-1105.
Yijun Li et al. "Universal Style Transfer via Feature Transforms." Nov. 17, 2017. arXiv:1705.08086v2. 11 pages.
Diederik P. Kingma et al., "A Method for Stochastic Optimization." Jan. 30, 2017. arXiv:1412.6980v9. 15 pages.

\* cited by examiner

LINE DRAWING GENERATION

BACKGROUND

Line drawings are used in many contexts. For example, line drawings are used for technical illustrations, in coloring books, and in the production of comic books, among other examples. A line drawing is an illustration in which objects are represented using only lines. Color, other than a background color, is absent, and the background color most often is uniform. The lines can depict the contours and/or shape of an object, and possibly also details of the object that may aid a person in recognizing the object and/or distinguishing the object from among other objects in the drawing. In some cases, textures may also be represented, using lines. For example, the appearance of bricks in a wall, strands of hair, or the surface of the ocean may be approximated by lines in the drawing.

Line drawings may be produced from photographs. Photographs provide artists with a convenient basis for quickly producing accurate and realistic images, which have correct proportions, perspective, depth, and/or content. Additionally, the artist does not need to be in situ and/or the occupy the time of a model when a photograph is available. For producing line drawings, the artist can trace aspects of the photograph, which further saves time over producing a drawing from a live situation or from the imagination, and increases the accuracy and possibly also detail of the resulting drawing.

Producing line drawings from photographs, even for very experienced artists, is very time consuming. Thus, it is an objective of digital image editing tools to produce line drawings from photographs in an automated fashion.

BRIEF SUMMARY

Automated systems for generating line drawings can greatly reduce the amount of time needed to obtain a line drawing from a photograph. Some automated systems operate on edge detection or identification of contours. Because these systems are not aware of the contents of a photographs, these systems may fail to distinguish between artistically desirable features that should be traced, and features that should be ignored.

The automated system for generating line drawings that is described herein uses a neural network that is trained to identify which features of an object for which lines should be drawn, and which features should be ignored. These judgements are inherently subject, and thus the neural network is trained on photographs and line drawings of the photographs, where the line drawings include the subjective decisions made by a human artist. By being trained on these line drawings, the neural network can learn to make similar judgments.

Examples described herein include a computer-implemented method including steps for performing the operations of generating a digital line drawing from a digital photograph; a computing device including one or more processors and a non-transitory computer-readable medium including instructions that, when executed by the one or more processors, cause the one or more processors to perform operations for generating a digital line drawing from a digital photograph; and a non-transitory computer-readable medium having stored thereon instructions that, when executed by one or more processors, cause the one or more processors to operations for generating a digital line drawing from a digital photograph. The operations for generating a digital line drawing from a digital photograph can include inputting a digital image into the neural network, the digital image including a photograph. The operations can further include identifying, using the neural network, contents of the photograph. The operations can further include applying a model to the contents, wherein the model is configured for the neural network, the model having first parameters for extracting a first set of features for drawing monochrome lines for illustrating the contents and having second parameters for a second set of features where lines are not to be drawn. The operations can further include extracting, using the neural network, the first set of features from the digital image and filtering out the second set of features. The operations can further include generating, using the neural network, a set of lines for the first set features, wherein the set of lines trace aspects of the contents. The operations can further include outputting, using the neural network, a digital line drawing of the digital image, the digital line drawing including the set of lines.

In some aspects, the digital line drawing includes edges of objects in the photograph and specific features of the objects.

In some aspects, the operations for generating a digital line drawing from a digital photograph can further include inputting output from the neural network into a second neural network, wherein the second neural network is trained to remove digital artifacts from a greyscale digital image and output a two-tone digital image, and wherein the second neural network outputs the digital line drawing. In some aspects, the second neural network is trained separately from the neural network on a data set of line drawings and copies of the digital line drawings, wherein the copies include digitally added artifacts.

In some aspects, the neural network is trained on a data set including digital photographs and digital line drawings of the digital photographs, and wherein the digital line drawings include lines for edges and specific features of objects in the digital photographs. In some aspects, lines for the specific features aid in recognizing the objects. In some aspects, lines for the specific features provide shape or definition to parts of the objects. In some aspects, the specific features include texture when the objects are in foregrounds of the digital photographs. In some aspects, the specific features exclude textures.

In some aspects, wherein the contents include a part of a person or an architectural structure. In some aspects, the photograph is of an outdoor scene or a building interior.

In some aspects, the digital line drawing is a two-tone digital image, the set of lines being a first tone and a background being a second tone, and wherein the set of lines are substantially uniform in width.

BRIEF DESCRIPTION OF THE DRAWINGS

The patent or application file contains at least one drawing executed in color. Copies of this patent or patent application publication with color drawing(s) will be provided by the Office upon request and payment of the necessary fee. Illustrative examples are described in detail below with reference to the following figures.

DETAILED DESCRIPTION

Figure 1B:
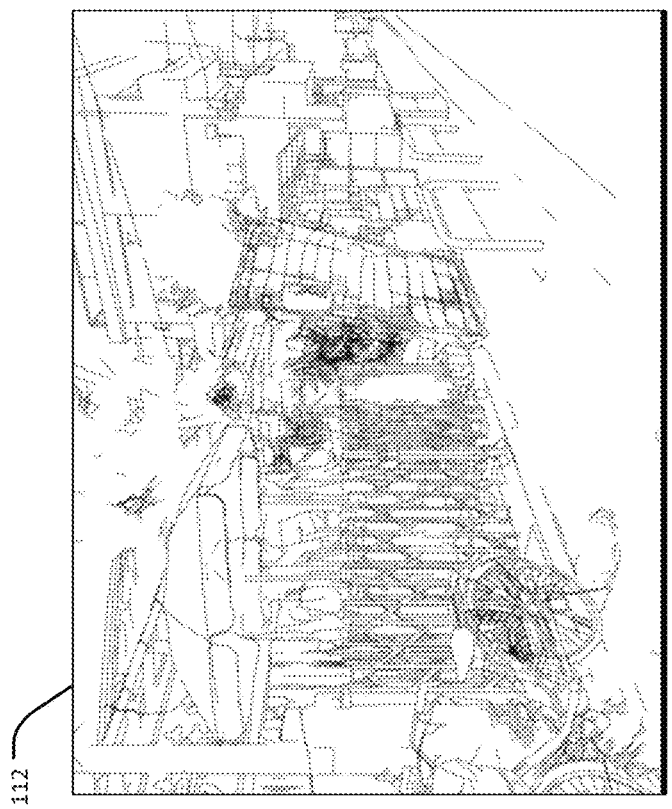
FIGS. 1A-1B include examples of a photograph and a line drawing of the photograph.

Described herein are techniques for automatically generating a digital line drawing of the contents of a photograph. In various examples, these techniques include use of a neural network, referred to herein as a generator network, that is trained on a dataset of photographs and human-generated line drawings of the photographs. The training data set teaches the neural network not only to trace the edges of objects in the photographs, but which edges should be traced and which can be ignored. The output of the generator network is a two-tone digital image (such as a black and white image), where the background of the image is one tone (e.g., all white), and the objects in the input photographs are represented by lines drawn in the second tone (e.g., black lines or greyscale lines).

Some input photographs may include ambiguous areas, where the generator network may not have clear direction for how to turn the area into lines. For example, a photograph may have textures or a high degree of detail that a human artist may ignore, or may include in the line drawing. In these situations, the generator network may conservatively output lines that are halfway between ignoring the area and drawing the details in the area, which may result in a smudge or visual noise, rather than clean lines. For these situations, the techniques discussed herein further include use of a second neural network, referred to herein as a restorer network. The restorer network can be trained on "unclean" line drawings, that is, line drawings that include visual artifacts, undesired lines, lines that do not have sharp edges, and/or too many broken lines, among other examples. The restorer network can be trained on the output of the generator network, for example. The target for the restorer network is a line drawing that lacks visual artifacts, and includes only relatively uniform lines. For example, the human-generated line drawing used the train the generator network can also be used to train the restorer network.

Various techniques have been for proposed for using digital image editing tools to produce line drawings from photographs. For example, some digital image editing programs include filters that can be applied to enhance the edges of objects and suppress areas between the edges. As another example, a digital image editing program can include the ability to manipulate the contrast in a photograph, such that, by manipulating the contrast and applying filters, strong edges of objects and textures can be emphasized, while weak edges are deemphasized.

These and other techniques, however, do not make use of semantic information about a photograph. When a human artist traces a photograph, the artist may make choices about which edges to trace and which edges to ignore. These choices can be based on factors such as the type of the object being traced, whether the object is close to the viewer or far from the viewer, whether the object is a prominent feature of the overall scene, and/or whether rendering the object with a high degree of detail may detract or enhance the appearance of the final drawing. Textures, for example, may be traced when the texture is significant to the image, but may be left out when the texture introduces excessive detail or is not a significant feature of the overall scene. These factors may be influenced not only by artistic judgment but also by well-established best practices.

In some cases, a human artist may further draw lines that simplify or modify an aspect of a photograph, or that appear in the photograph as a gradient as opposed to a hard edge. For example, the artist may draw a straight line for an edge that is wavy or may join disconnected edges into a single, continuous line. In these and other examples, a faithful tracing may be visually disruptive or introduce excessive detail. As another example, the artist may draw the edge of a person's nose, which may appear in a photograph only as a subtle gradient rather than as a hard edge. In this and other examples, lines drawn where a photograph lacks hard edges can provide visual clues as to what the output line drawing represents.

Because image manipulation techniques that rely on edge detection, filtering, and/or color manipulation do not make use of an understanding of the contents of a photograph, these techniques may fail to produce an image that approaches what would be produced by a human artist. For example, the output image may include edges that an artist would omit, or may overly faithfully reproduce edges that an artist may simplify. As another example, the output image may omit details that may be difficult to identify through edge detection alone, such as the details of a person's, face. In some cases, the output looks like a filtered photograph, rather than a clean line drawing.

Because automated production of line drawings from photographs may require a computer to make human-like decisions, techniques discussed herein apply neural networks to solve the problem. Neural networking is a branch of artificial intelligence in which computer processes attempt to mimic the operation of the human brain. Through a process referred to as training, a neural network is provided input data, and the output data of the neural network is compared against an expected output. Values at nodes of neural network, referred to as weights, can then be adjusted according to the difference between the output and the expected output. By being provided a set of input data that includes many different possible variations, the neural network can learn to perform a particular task. For example, neural networks have been trained to perform recognition of classes of objects, speech recognition, and language translation, among other examples. Once trained, the neural network can be applied to data for which the result is not known. Use of a neural network is referred to as inference.

The neural networks described herein are trained on photographs, such as photographs of faces and bodies and/or photographs of architectural scenes, with the expected output being line drawings of the photographs. A challenge in training a neural network on this data set is obtaining a sufficient quantity of training data. The expected data is produced by a human artist, so that the neural network can learn to make the decisions made by the artist, and, as noted previously, for a human artist, producing a line drawing may be time consuming. The use of two neural networks, trained for slightly different tasks, can improve on the results obtained with a limited training data set. Techniques for further improving the results, such as pre-training and artificially generated images, are also discussed here.

The techniques discussed herein can provide a computer-implemented method for generating line drawings from photographs that can overcome the limitations of previous methods. Because a neural network can gain a semantic understanding of the contents of a photograph, the neural network can make decisions based on the subject matter of the photograph, rather than relying only on pixel values. Additionally, the neural network can learn, from the training data, the particular decisions an artist would make in producing a line drawing, and can attempt to mimic the same decision making process. As a result, the neural network can produce a result that approximates the work of a human artist, which the human artist may require hours to produce, in a matter of seconds.

Figure 1A:

FIGS. 1A-1B include examples of a photograph 110 and a line drawing 112 of the photograph 110. In this example, the photograph 110 is an architectural scene, in particular, a street scene. "Architectural," in this context, refers to a scene that includes physical structures and possibly also related and/or surrounding elements. Examples of physical structures that can be included in an architectural scene include the exteriors and/or interiors of buildings. Examples of related and/or surrounding elements include, for building exteriors, streets, street signs, utility lines, vehicles, bridges, and natural elements such as trees, rivers, and mountains, among other examples.

Photographs of architectural scenes are one example of subject matter that is rendered into line drawings. Line drawings of street scenes and building interiors can be used, for example, as background scenes for comic books. In this example, a comic books artist can draw characters into the scene, and/or can color in features of the scene.

The example photograph 110 of FIG. 1A is of a sidewalk along a street. The photograph 110 includes objects with relatively straight and regular edges, such as a building, a utility pole, a fence, and the edge of the sidewalk. The photograph 110 also includes objects with irregular shapes and edges, such as trees and a wicker-work screen. The photograph 110 further includes many textures, such as the texture of the wicker screen, the texture of the trees, plastic sheeting, and wooden planks of a fence, among other examples.

FIG. 1B includes a line drawing 112 of the photograph 110, produced using the automated systems discussed herein. As illustrated by this example, the line drawing 112 includes the major elements of the photograph 110, including the buildings, the edge of the sidewalk, the fence, the wicker screen, the sun umbrella, and the bicycle located close to the viewer. The line drawing 112 also simplifies some elements, such as the trees. It may have been decided, in training the automated system, that faithful tracing of these areas would produce too much detail. Alternatively or additionally, it may have been decided to minimize the lines in these areas, so that an artist working with the line drawing 112 can decide how the areas are to be treated. The line drawing 112 further includes some textures, while others have been simplified or left out. For example, the portion of the fence that is closer to the viewer has been rendered in greater detail, while a portion that is further away has only been partially rendered. As another example, the texture of the wicker screen has been rendered to give only a suggestion that the screen is made of wicker-work, instead of each edge and shadow of the wicker being drawn.

Figure 2B:
FIGS. 2A-2B includes another example photograph and a lined drawing of the photograph.
Figure 2A:

FIGS. 2A-2B includes another example photograph 210 and a line drawing 212 of the photograph 210. In this example, the photograph 210 is a portrait; that is, a photograph of a person with the person's face prominently featured. Photographs of people, including faces or a person's body, are other examples of subject matter that is rendered into line drawings. Line drawings of people can be used, for example, as in coloring books.

The example photograph 210 of FIG. 2A includes a girl holding two kittens. As is often the case with portrait photography, the background of the photograph 210 is out of focus so that visual emphasis is on the girl and the kittens.

FIG. 2B includes a line drawing 212 of the photograph 210, produced using the automated systems discussed herein. As illustrated in this example, prominent features of the girl and kittens, including eyes, the nose, the mouth, and whiskers, have been drawn while some textures, such as the girl's hair and the kitten's fur, have largely been left blank. Additionally, the background has been left out completely. It may have been decided, in training the automated systems, that when a part of a photograph is out of focus, that part should not be drawn. In the case of the line drawing 212 of FIG. 2B, this may have been done so that only the prominent subject of the photograph is rendered.

Figure 3:
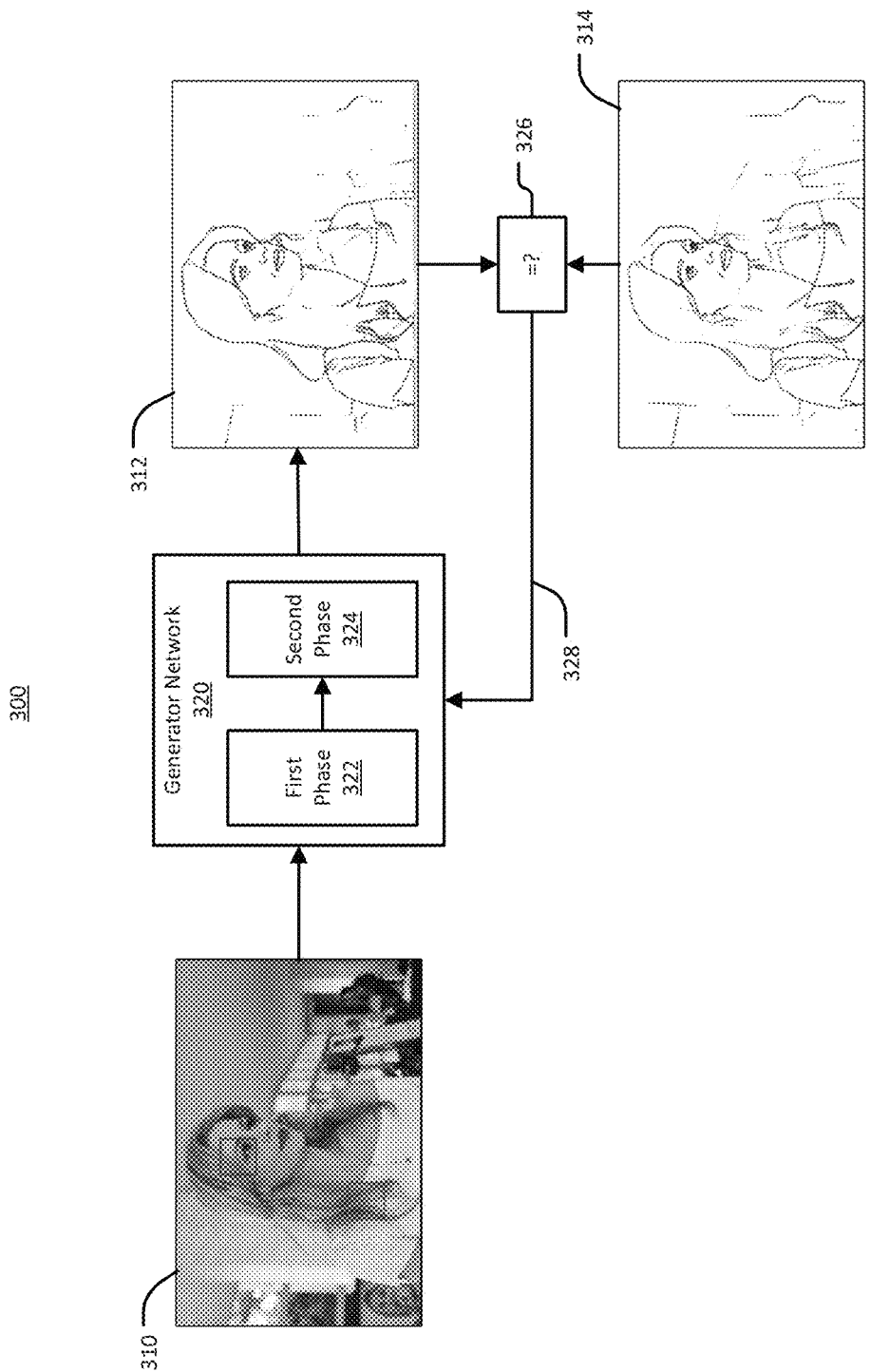
FIG. 3 includes a diagram of illustrating an example of an automated system for producing line drawings.

FIG. 3 includes a diagram of illustrating an example of an automated system 300 for producing line drawings. The system 300 includes a neural network, referred to here as a generator network 320. The term "generator" is being used only for the sake of clarity, and is not intended to imply any specific meaning or functionality. The generator network 320 is also referred to herein as a first neural network.

In various examples, the generator network 320 takes as input a photograph 310 and outputs a line drawing 312 of the photograph 310. The line drawing 312 can also be referred to as the predicted drawing, or the drawing predicted by the generator network 320. During training, the line drawing 312 is compared against an expected result 314. The expected result 314 can also be referred to as the ground truth or the target image. Differences between the line drawing 312 and the expected result 314 can be used to modify values in the generator network 320. When the generator network 320 performs inference (e.g., the generator network 320 is trained and in operation), the line drawing 312 can be output as a final result. In various examples, the line drawing 312 may be sufficiently clean and detailed to be used without further processing. "Clean" in this context means that the line drawing 312 lacks smudges, stray and disconnected pixels, other visual noise, lines that are not sharp (e.g., are shades of grey rather than black), and lines that have blurred rather than sharp edges, among other examples.

The photograph 310 can be a pixel-based digital image; that is, an array of pixels with each pixel having a set of values representing a, hue, luminance, tone, and/or other value that enables the pixel to represent a color, shade, and/or tint. The photograph 310 may be in color, and thus have three color channels (e.g., red, green and blue) or may be in greyscale, and thus have one color channel (e.g., ranging in value from white to black). The line drawing 312 can also be a pixel-based drawing. In some examples, the pixels in line drawing 312 are either black or white. In some examples, the line drawing 312 may have pixels in shades of gray, for example along the edges or at the ends of lines. The expected result 314 can also be a black and white pixel-based image, or a greyscale image.

In various examples, the generator network 320 models long-range interactions between pixels of the photograph 310 and suppresses small lines or lines that are not desired. To implement such a model, the generator network 320 can internally include a first phase 322 and a second phase 324. The first phase 322, which can also be referred to as an encoder, can be trained to recognize high-level features in the input photograph 310, such as structural elements, edges, gradients, objects, combinations of objects, textures, and other aspects of the contents of the input photograph 310. For example, the first phase 322 can be trained to identify faces and to segment a face into eyes, nose, mouth, and hair, among other examples. As another example, the first phase 322 can be trained to identifying architectural elements such as buildings, walls, streets, floors, furniture, and so on, as well as objects that might be found among the architectural elements, such as plants. The output of the first phase 322 can be a mapping of the contents of the input photograph 310. The contents can be represented, for example, using a set of matrices that each describe a feature of the photograph 310, and may be called feature maps. The feature maps can indicate, for example, locations of edges, gradients, objects, textures, and other aspects of the contents of the input photograph 310, and possibly also other information, such as sizes, scales (e.g., distance from the viewer), densities, complexities, and so on. In some examples, based on the training of the generator network 320, the feature maps can omit information, such as textures or details. The omitted information can include aspects of the input photograph 310 for which lines are not to be drawn.

The second phase 324, which can also be referred to as a decoder, can use the mapping to produce the output line drawing 312. For example, the second phase 324 can convert the contents identified by the first phase 322 (e.g., structural elements, edges, gradients, objects, textures, etc.) from the descriptions provided by the feature maps into pixels in a digital image, with lines drawn for the contents where lines were identified to be drawn by the feature maps. As an example, the second phase 324 can associate features in the photograph 310, such as eyes, a mouth, or chairs, as objects to be traced in detail. As another example, the second phase 324 can associate features such as hair or plants as objects to be outlined with minimal detail. The second phase 324 can produce the line drawing 312.

For training the generator network 320, the system 300 can include a equivalency function 326 that compares the line drawing 312 against the expected result 314 that corresponds to the photograph 310. The equivalency function 326 can, for example, perform a pixel-by-pixel comparison of the line drawing 312 and the expected result 314 and output any differences. Alternatively or additionally, the equivalency function 326 can implement a loss function or a cost function that measures an amount of error between the line drawing 312 and the expected result 314. The output of the equivalency function 326 can be provided as feedback 328 to the generator network 320. Differences or errors noted in the feedback 328 can be propagated through the layers of the generator network 320 to adjust weight values of the nodes of the generator network 320. The weight values can be adjusted to minimize the differences or errors.

Figure 4:
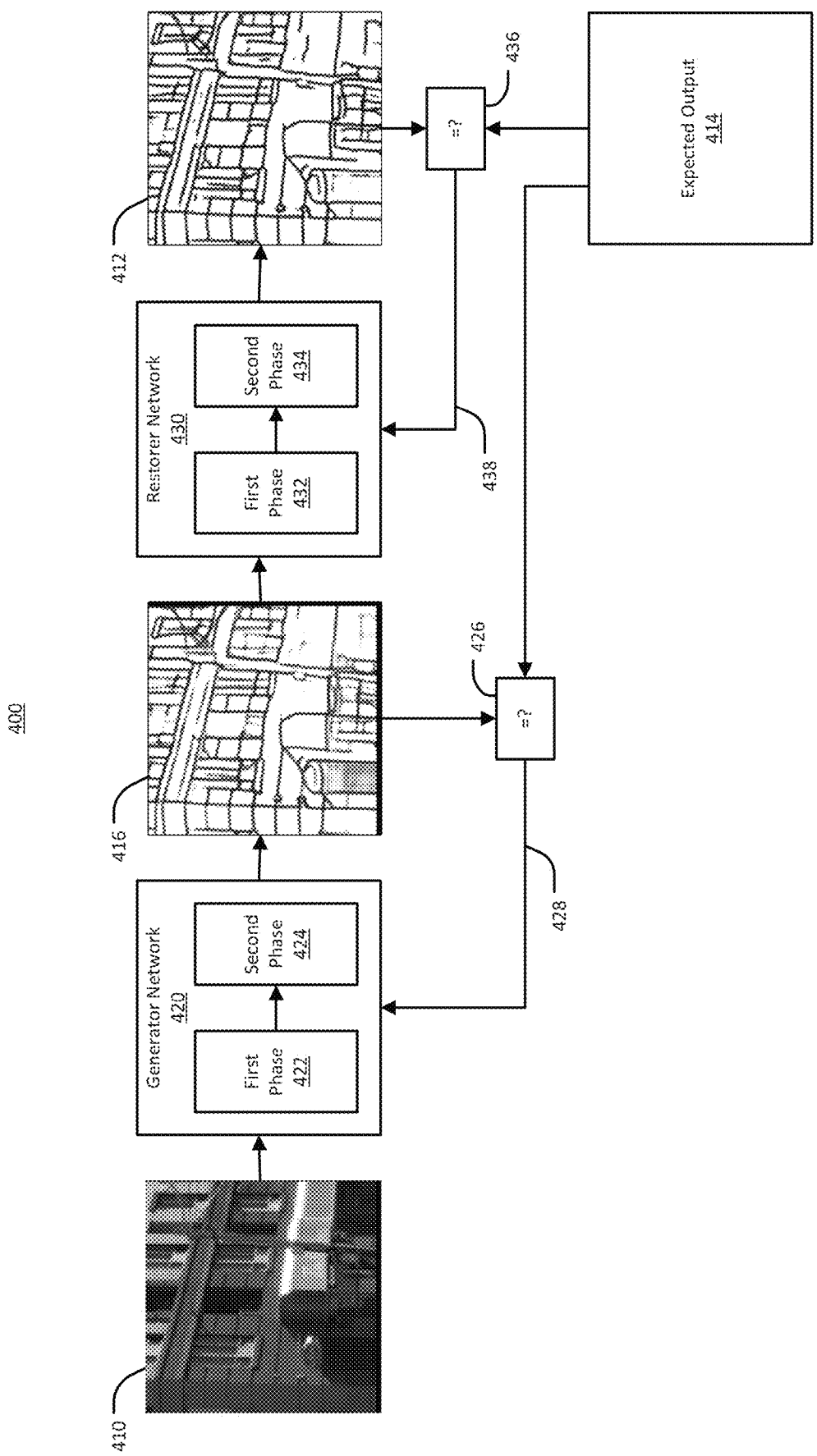
FIG. 4 includes a diagram illustrating another example of an automated system for producing line drawings.

FIG. 4 includes a diagram illustrating another example of an automated system 400 for producing line drawings. The system 400 includes a first neural network, referred to as a generator network 420, and a second neural network, referred to as a restorer network 430. The terms "generator" and "restorer" are being used only for the sake of clarity, and are not intended to imply any specific meaning or functionality. The generator network 420 may alternately be referred to as the first neural network and the restorer network 430 may alternately be referred to as the second neural network.

In various examples, the generator network 420 takes as input a photograph 410 and extracts lines from the photograph 410. The generator network 420 outputs the extracted lines in an intermediate image 416. The system 400 inputs the intermediate image 416 into the restorer network 430, which can produce the finished line drawing 412. During training, the line drawing 412 can be compared to an expected output 414, and results from the comparison can be fed back to the generator network 420 and/or the restorer network 430 so that weight values of the neural networks can be adjusted. In various examples, the photograph 410, the intermediate image 416, the line drawing 412, and/or the expected output 414 can be pixel-based images.

In some examples, the intermediate image 416 is sufficiently similar (e.g., has fewer than 20%, 10%, 5%, or another percentage of differences or errors) to the expected output 414, and can be used as the final output of the system 400. In some examples, the intermediate image 416 has too many differences or errors. For example, the generator network 420 may only be able to extract coarse lines from the photograph 410. As another example, there may be some areas where the generator network 420 does not have sufficient information (due, for example, to the size of the training data set) to make a decision, or the generator network's training indicates that one answer is as good as another. In this example, the generator network 420 may take a conservative, middle-of-the-road approach, which may result in areas in the intermediate image 416 that are smudged, unclear, noisy (e.g., having stray, disconnected pixels), or otherwise not include sharply defined lines.

In various examples, the restorer network 430 can be trained to take a greyscale image that includes some desired lines and also includes visual noise, and remove the visual noise so that the resulting line drawing 412 includes only sharply defined lines. For example, the restorer network 430 can consider neighboring pixels, and if a group of neighboring pixels do not form a solid, clean line, the restorer network 430 may remove the pixels. As another example, the restorer network 430 can identify lines that are blurred and not sharp (e.g., are grey and/or have edges that fade to grey) and can turn these lines into solid lines and/or trim the edges. The output of the restorer network 430 can be provided as the final result from the system 400.

In various examples, the generator network 420 includes a first phase 422 and a second phase 424. The first phase 422 can be referred to as an encoder, and the second phase 424 can be referred to as a decoder. In various examples, the first phase 422 can be trained to perform object recognition and/or object segmentation. The output of the first phase 422 can be a mappings, captured in a set of feature maps, that describe various aspects of the contents of the photograph 410. The second phase 424 can be trained to turn the feature maps into the intermediate image 416. For example, the second phase 424 can perform up-sampling to restore the feature maps to the size of the photograph 410, and can combine the feature maps to produce the lines of the intermediate image 416. In some examples, the generator network 420 can be similar to the generator network described with respect to FIG. 3.

In various examples, the restorer network 430 of FIG. 4 also includes a first phase 432 and a second phase 434. The first phase 432 and second phase 434 of the restorer network 430 can also be referred to as an encoder and a decoder, respectively. The first phase 432 can be trained to recognize lines, as well as image features that are noise rather than lines. The first phase 432 can produce a set of feature maps that describe the lines and visual noise in the intermediate image 416. The second phase 434 can use the feature maps to eliminate visual noise and/or to convert some visual noise into lines. The output of the restorer network 430 is the line drawing 412, which may contain only solid black lines (or lines of another color) and little to no gray areas.

For training the generator network 420 and the restorer network 430, the system 400 can include a first equivalency function 426 and a second equivalency function 436. The first equivalency function 426 can compare the intermediate image 416 against the expected output 414 and provide feedback 428 to the generator network 420. The second equivalency function 436 can compare the line drawing 412 to the expected output 414 and provide feedback 438 to the restorer network 430. In some examples, the first equivalency function 426 compares the line drawing 412 against the expected output 414 to determine feedback for the generator network 420.

Figure 5:
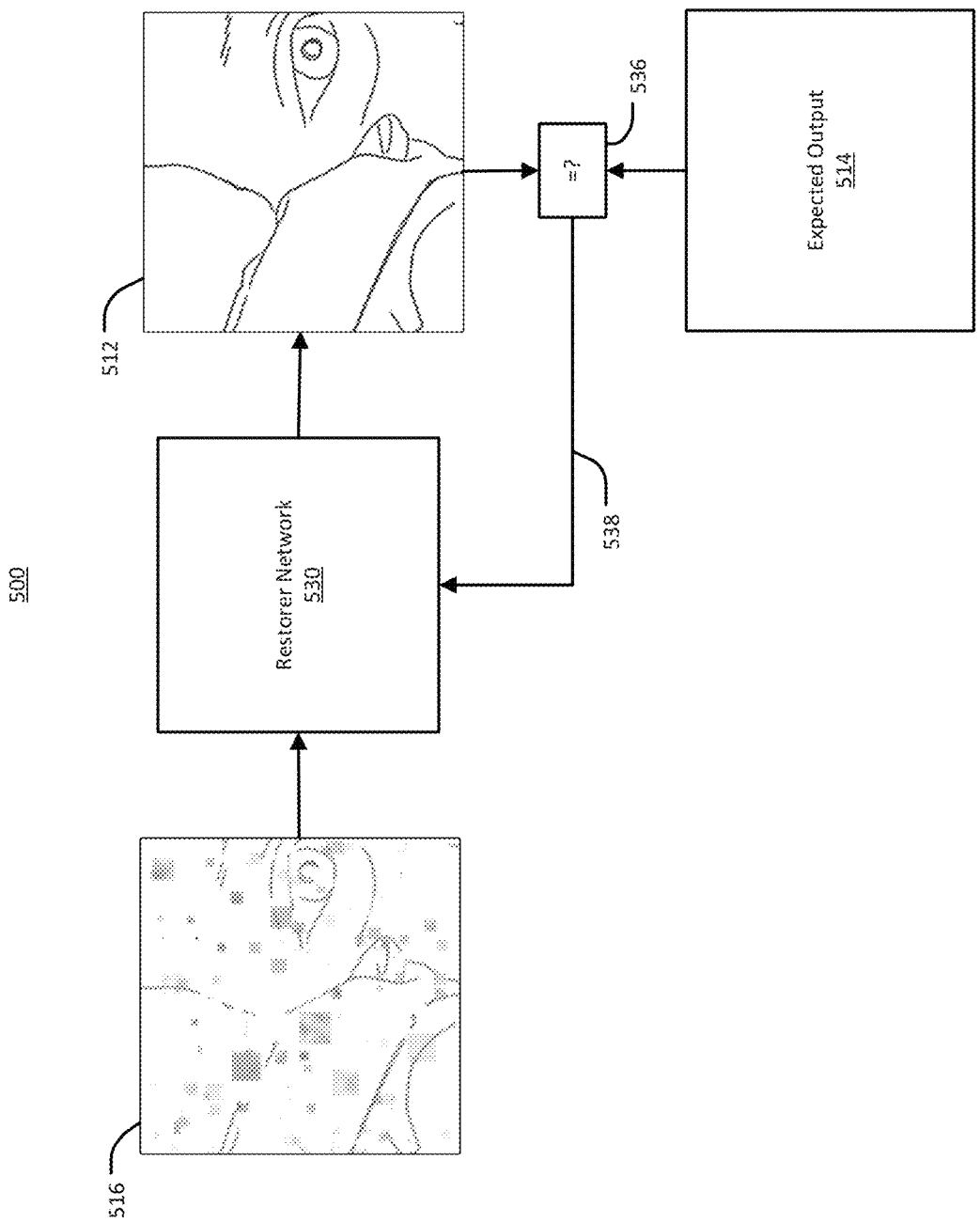
FIG. 5 includes a block diagram illustrating an example of a system for training a restorer network.

FIG. 5 includes a block diagram illustrating an example of a system 500 for training a restorer network 530. The restorer network 530 is a neural network such as is described above with respect to FIG. 4. As discussed previously, the restorer network 530 of FIG. 5 can be trained, for an input line drawing that has visual noise, to remove the visual noise and output a line drawing 512 that includes primarily clearly defined, sharp lines.

As discussed above, the restorer network 530 can be trained on the output of another neural network, which processes a photograph to produce an image with coarsely defined lines. The line drawing 512 produced by the restorer network 530 can be compared to a human-generated line drawing of the photograph, and differences can be used to train the restorer network 530. It may be difficult, however, to obtain a large quantity of line drawings for photographs, due to the time and effort required to produce manually line drawings. With only a small training data set, the restorer network 530 may not be able to achieve a high degree of accuracy.

In various examples, the system 500 can thus train the restorer network 530 on line drawings that have had defects and visual noise added. An input image from this data set will be referred to as a deteriorated image 516, a synthetically deteriorated image, or a synthetic image. In various examples, the deteriorated image 516 can be produced by taking any line drawing and applying digital tools and/or filters to the drawing to produce effects such as faded lines, blurred lines, and/or random areas that include random scatterings of pixels of various shades. The line drawings used to produce this data set can be obtained from various sources, such as coloring books, comic books, and technical drawings, for example. Photographs corresponding to the drawings obtained from these sources may be not be available, and thus these drawings may not be useable to train, for example, the system of FIG. 4. Large quantities of these drawings may be available, however, and digital image editing tools can be programmed to corrupt these drawings, and thereby produce a large training data set.

In the training process, a source line drawing used to produce the deteriorated image 516 can be used as the expected output 514. The system can compare the expected output 514 against the line drawing 512 output by the restorer network 530 using an equivalency function 536. The differences and/or errors determined by the equivalency function 536 can be provided as feedback 538 to the restorer network 530, and can be propagated through the layers of the restorer network 530 to adjust the weight values of the restorer network 530 so that the differences or errors are minimized.

Figure 6:
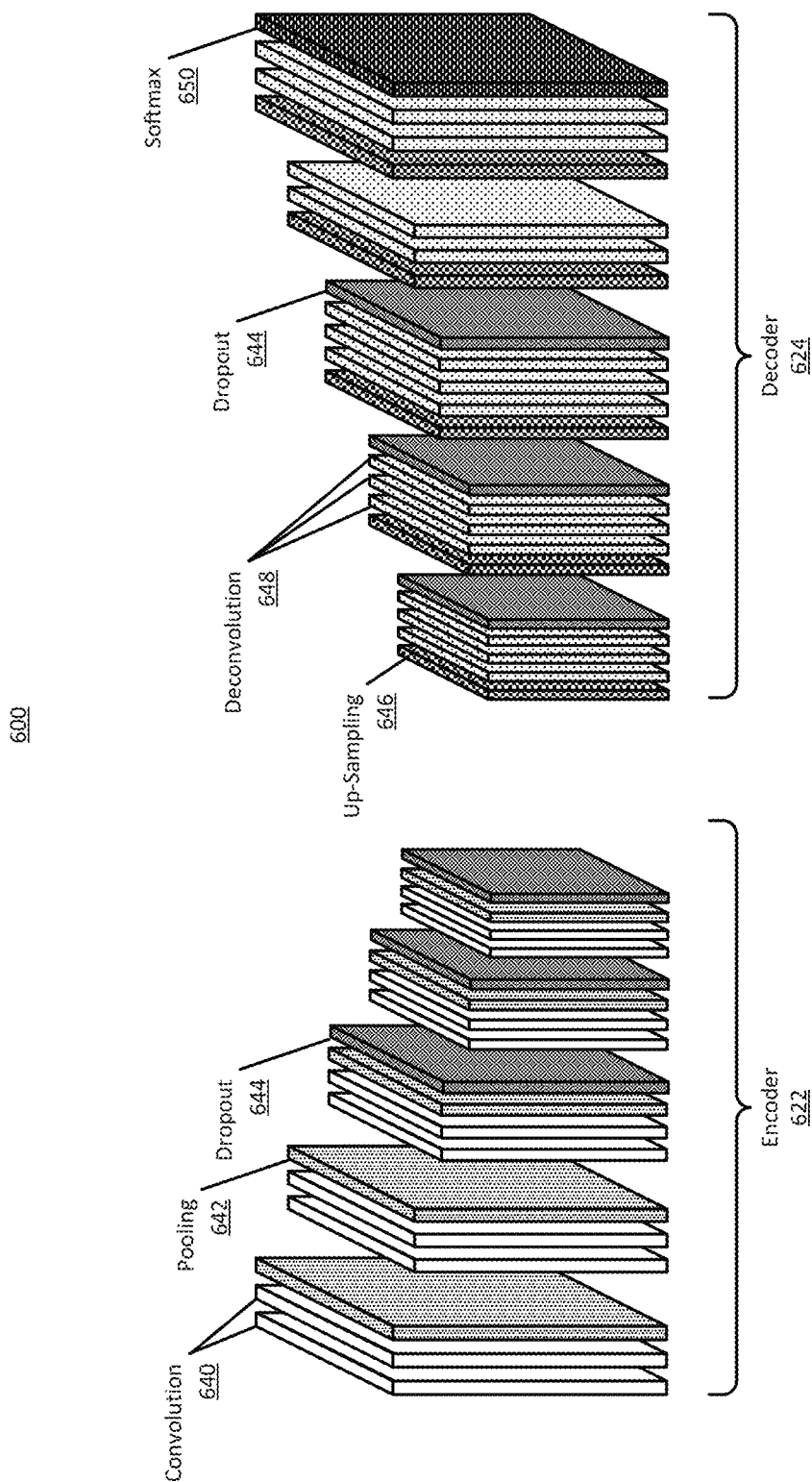
FIG. 6 illustrates a generalized example neural network architecture.

Examples of the generator network and the restorer network of the systems described above will now be discussed. FIG. 6 illustrates a generalized example neural network architecture 600, variations of which can be used to implement the generator network and or the restorer network. The example neural network architecture 600 has a encoder-decoder configuration, where the encoder 622 layers perform convolution and other operations, and the decoder 624 layers perform deconvolution and other operations. In the example of FIG. 6, each layer of the neural network architecture 600 is represented by a three-dimensional square, with different types of layers indicated with different fill patterns. Additionally, the size of the squares indicate the size of the feature maps output by each layer, relatively the input feature maps.

In various examples, the layers that can be included in the neural network architecture 600 include convolution 640 layers, pooling 642 layers, dropout 644 layers, up-sampling 646 layers, and deconvolution 648 layers. The neural network architecture 600 of FIG. 6 also includes a softmax 650 layer as the last layer. The neural network architecture 600 can further include other layers that are not illustrated here, such as fully connected layers or recurrent layers, among other examples. Each layer, other than the first layer, operates on the outputs of the previous layer. The first layer operates on data input into the neural network, and the last layer outputs a final result. The input data may be matrices of values that represent information such as pixel values in an image, sounds in an audio segment, or words or word fragments, among other examples. Inputs to the layers can be referred to as input feature maps and the outputs of layers can be referred to as output feature maps.

The convolution 640 layers perform a convolution on one or more input feature maps. Convolution can involve the application of a filter to an input feature map, where the filter and the input feature map are each matrices. The filter can be configured to extract certain features from the input feature map, such as lines, edges, curves, corners, blobs, ridges, and so on. A filter can also be referred to as a kernel or a feature detector. A convolution layer may apply more than one filter to the same set of input figure maps.

In the neural network architecture 600, a convolution 640 layer can perform additional operations on the result of a convolution, such as batch normalization and application of non-linearity. Batch normalization can constrain the output values of a layer and improve the stability of the neural network during training. By constraining the output values, a subsequent layer is not trained on extreme values, and thus training of the overall network can be performed more quickly. Non-linearity can be added after some convolution operations. Convolution is a linear operation, and in some examples, it is assumed that the real-world data the convolutional neural network is to learn about is non-linear. Thus, a non-linear function can be applied, element-wise, to the output feature maps from a convolution. One such non-linear function is provided by a Rectified Linear Unit (ReLU), whose output is given by Output=Max (0, Input). Other non-linear functions include tanh and sigmoid.

In the encoder 622 of the neural network architecture 600, sets of convolution 640 layers are followed by a pooling 642 layer. Pooling, which is can also referred to as sub-sampling or down sampling, can reduce the dimensionality of a feature map while retaining the most important information. Pooling can include, for example, taking a region of values in the matrix of a feature map (e.g., a 2×2 neighborhood, or a neighborhood of another size), and determining a maximum value across the values in the region. Alternatively, average, sum, or another function can be used as the pooling function. Pooling can be used to progressively reduce the spatial size of the input representation. For example, pooling can make the input representations (e.g., the feature dimension) smaller and more manageable. As another example, pooling can reduce the number of parameters and computations that need to be performed by the neural network. As another example, pooling can make the neural network invariant to small transformations, distortions, or translations in the input image. That is, a small distortion in the input is not likely to change the output of the pooling, since the maximum (or average, or sum, or some other operation) is taken in a local neighborhood. As a further example, pooling can assist in determining an almost scale invariant representation of the image (referred to as an equivariant representation). This means, for example, that an object can be detected in an image no matter where the object is located within the image.

The encoder 622 can further include dropout 644 layers. Dropout layers reduce the problem of overfitting. Overfitting occurs when a neural network learns details and noise in the training data, where the details and noise do not apply to all situations. Overfitting can hinder the neural network in learning new data. Dropout layers reduce the overfitting problem by temporarily removing nodes in a layer, including the nodes' incoming and outgoing connections and thereby approximating the result of averaging the outputs of the layer.

Pooling reduces the resolution of the feature maps, thus the decoder 624 layers include up-sampling 646 layers to resize the feature maps back up to the size of the original input. The up-sampling 646 can perform different types of interpolation, such as nearest neighbor, bilinear, bicubic spline, or generalized bicubic interpolation, among other examples.

The deconvolution 648 layers of the decoder 624 perform an inverse convolution to "restore" the input feature maps that were convolved by the convolution 640 layers. The deconvolution operation may not be an attempt to truly restore an input feature map, but rather may restore an altered version of the input feature map by using a different filter than was used in convolving the input feature map. A deconvolution 648 layer can also include batch normalization of the result of the deconvolution, and/or application of non-linearity.

The softmax 650 layer can apply the softmax function to normalize the outputs of the second-to-last layer into a probability distribution. The probability distribution can be over the classes for which the neural network is trained to output predictions. For example, when the neural network is trained to recognize images of cats, softmax can output a probability that an input image does or does not contain a cat. In the neural network architecture 600, softmax can be used to output pixel value probabilities, such as whether a particular pixel should be one color or another, for example. In various examples, functions other than softmax can be used in the last layer, such as a sigmoid function. I Table 1 illustrates an example configuration for the generator network. In this example, the first phase of the generator network (e.g., the encoder) is implemented using a ResNet-50 neural network, which is a 50-layer-deep convolutional neural network configured for object classification. In some examples, a portion of ResNet-50 is used, such as the first 20, 30, 40, or some other number of layers. For example, layers up to the conv3_4 layer can be used. In other examples, other neural networks can be used, or a neural network with a custom configuration can be used. The remaining layers illustrated in Table 1 are _for the second phase (e.g., the decoder).

TABLE 1

| Layer type | Kernel | Strides | Output Size |
|---|---|---|---|
| input | | | 3 × H × W |
| ResNet-50 (~conv3_4) | | | 512 × H/8 × W/8 |
| spatial dropout | | | 512 × H/4 × W/4 |
| up-sampling | | | 512 × H/4 × W/4 |
| convolution | 3 × 3 | 1 × 1 | 512 × H/4 × W/4 |
| convolution | 3 × 3 | 1 × 1 | 256 × H/4 × W/4 |
| convolution | 3 × 3 | 1 × 1 | 128 × H/4 × W/4 |
| up-sampling | | | 128 × H/2 × W/2 |
| convolution | 3 × 3 | 1 × 1 | 128 × H/2 × W/2 |
| convolution | 3 × 3 | 1 × 1 | 64 × H/2 × W/2 |
| convolution | 3 × 3 | 1 × 1 | 32 × H/2 × W/2 |
| up-sampling | | | 32 × H × W |
| convolution | 3 × 3 | 1 × 1 | 32 × H × W |
| convolution | 3 × 3 | 1 × 1 | 16 × H × W |
| convolution | 3 × 3 | 1 × 1 | 1 × H × W |

In the example of Table 1, the output of the ResNet-50 network includes 512 matrices that have one eighth the resolution of the input image. Downscaling is a frequent feature of convolutional neural networks, as each of the 512 feature maps each focus on a particular aspect of the input image. The subsequent layers upscale the feature maps to the original input size, and combine the different features identified by ResNet-50 into the single, desired feature (e.g., a line drawing). In various examples, the values in the output of the generator network are within a range of 0 to 1, inclusive.

Table 2 illustrates an example configuration for the restorer network. As illustrated by this example, the first phase (e.g., the encoder) of the restorer network produces 256 feature maps that are each ⅛ the size of the input image. The second phase (e.g., the decoder) up-samples the feature maps in stages, and applies filters that consider neighboring pixels. In various examples, the values in the output of the restorer network 430 are within a range of 0 to 1, inclusive.

TABLE 2

| Layer Type | Kernel | Stride | Output Size |
|---|---|---|---|
| input | | | 3 × H × W |
| convolution | 5 × 5 | 2 × 2 | 16 × H/2 × W/2 |
| convolution | 3 × 3 | 2 × 2 | 32 × H/4 × W/4 |
| convolution | 3 × 3 | 1 × 1 | 64 × H/4 × W/4 |
| convolution | 3 × 3 | 2 × 2 | 128 × H/8 × W/8 |
| convolution | 3 × 3 | 1 × 1 | 256 × H/8 × W/8 |
| convolution | 3 × 3 | 1 × 1 | 256 × H/8 × W/8 |
| convolution | 3 × 3 | 1 × 1 | 128 × H/8 × W/8 |
| convolution | 3 × 3 | 1 × 1 | 64 × H/8 × W/8 |
| spatial dropout | | | 64 × H/8 × W/8 |
| up-sampling | | | 64 × H/4 × W/4 |
| convolution | 3 × 3 | 1 × 1 | 64 × H/4 × W/4 |
| convolution | 3 × 3 | 1 × 1 | 32 × H/4 × W/4 |
| up-sampling | | | 32 × H/2 × W/2 |
| convolution | 3 × 3 | 1 × 1 | 32 × H/2 × W/2 |

TABLE 2-continued

| Layer Type | Kernel | Stride | Output Size |
| --- | --- | --- | --- |
| convolution | 3 × 3 | 1 × 1 | 16 × H/2 × W/2 |
| up-sampling | | | 16 × H × W |
| convolution | 3 × 3 | 1 × 1 | 16 × H × W |
| convolution | 3 × 3 | 1 × 1 | 8 × H × W |
| convolution | 3 × 3 | 1 × 1 | 1 × H × W |

The generator network or the combined generator network and restorer network can be trained on a data set $D_{train}$. The training data set can include pairs of color photographs x and target line drawings y. A color photograph x can be x∈ $\mathbb{R}^{3 \times W \times H}$; that is, each x can include three matrices (one for each of a red, blue, and green color channel) of real values each having a width W and a height H. In some examples, $D_{train}$ can, additionally or alternatively, include greyscale images having one matrix of real values of a width W and a height H. A line drawing y can be y∈$\mathbb{R}^{1 \times W \times H}$; that is, each y can have one matrix of real values that has a width W and a height H. The output of the generator network is a greyscale image G(x)∈$\mathbb{R}^{1 \times W \times H}$. The output of the restorer network is also a greyscale image, R(G(x))∈$\mathbb{R}^{1 \times W \times H}$.

Figure 7:
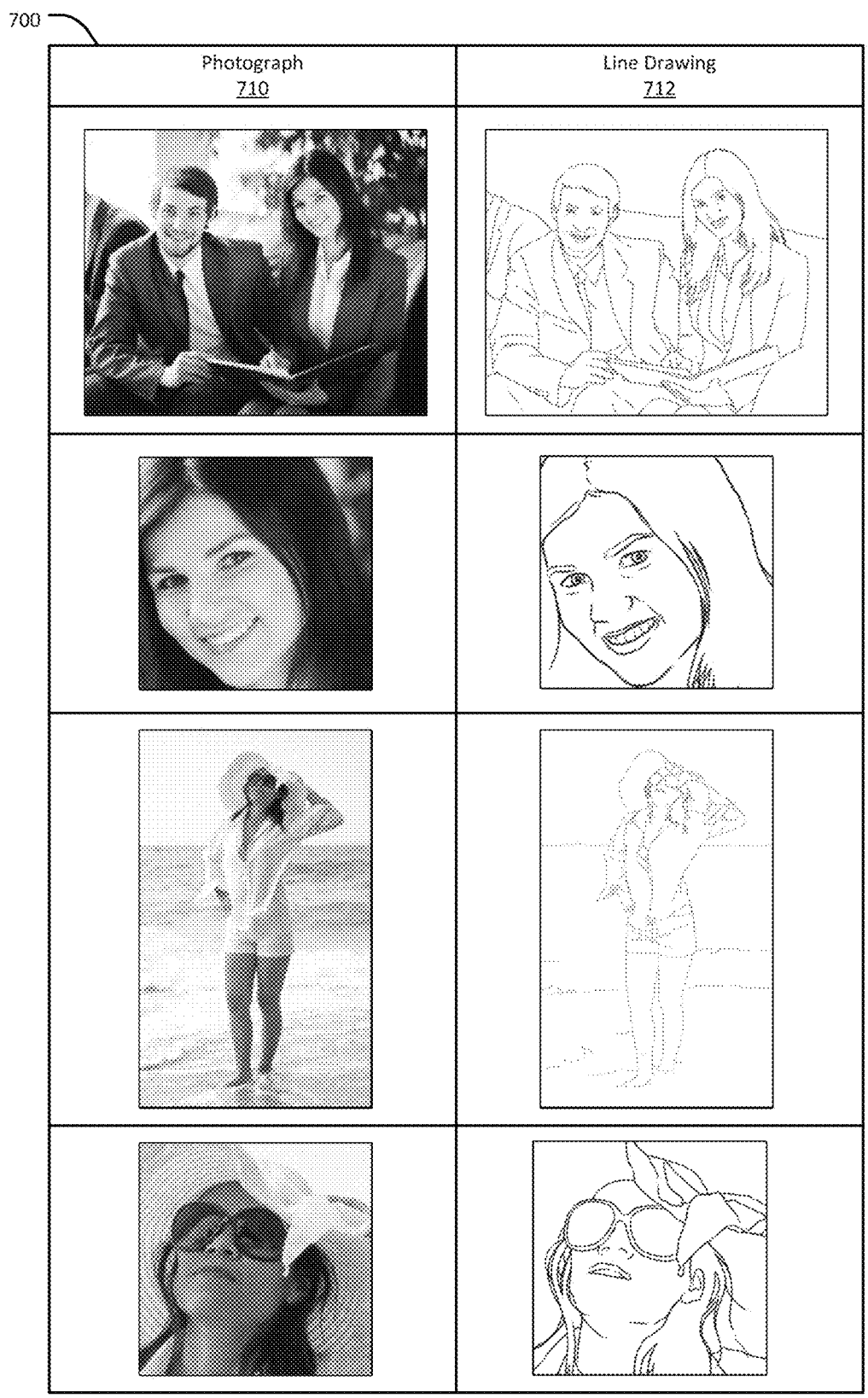
FIG. 7 includes a table of sample photographs and line drawings.

FIG. 7 includes a table 700 of sample photographs 710 and line drawings 712 that can be included in the $D_{train}$ data set. In this example table 700, the photographs 710 include images of people, including faces and full or partial bodies. The photographs can range from 602×602 pixels to 1,946× 2,432 pixels, or can be larger or smaller than this range. The line drawings 712 can be produced by a human artist. To increase the size of the data set, the data set further includes faces be cropped from the photographs 710 and corresponding areas from the line drawings 712. The data set represented by the table 700 can, for example, include 138 photograph and line drawing pairs.

A neural network that is trained on the data set that is represented in the table 700 can be more effectively trained if the expected output (the line drawings 712) are consistent in style and content. Thus, artists that generated the line drawings were instructed to follow the style of a single artist, as represented by a sample set of line drawings. Additionally, the artists were instructed ignore out of focus areas (such as the background), and/or to draw lines for significant parts of the background (e.g., the horizon or a piece of furniture. reduce the effect of different artists having different styles, artists were also instructed to provide outlines for areas with complex textures, such as hair.

Figure 8:
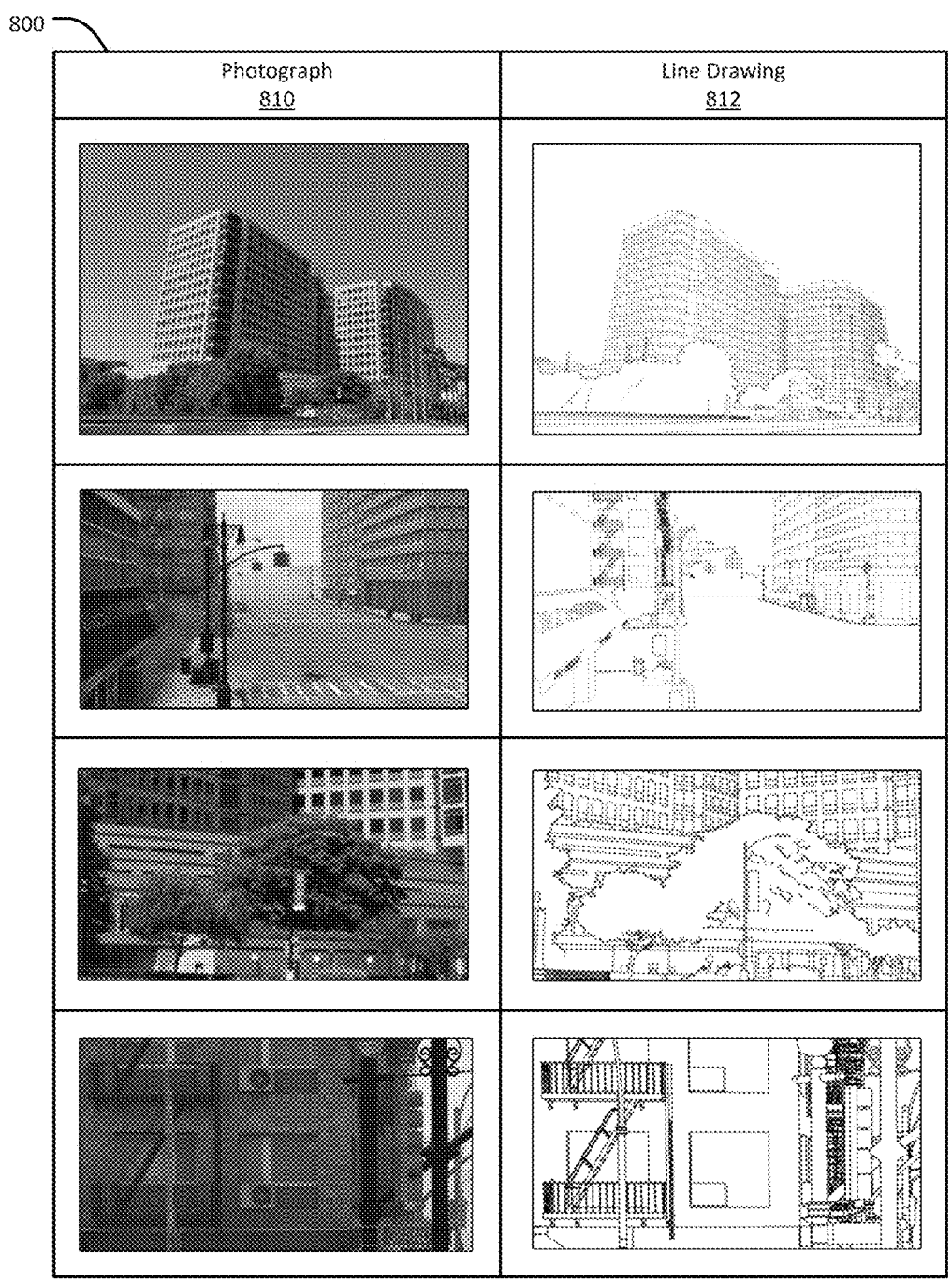
FIG. 8 includes another table of sample photographs and line drawings.

FIG. 8 includes another table 800 of sample photographs 810 and line drawings 812 that can be included in the $D_{train}$ data set. In this example table 800, the photographs 810 include architectural scenes, in this case including buildings and street scenes. Though not illustrated here, this data set can also include indoor scenes. The photographs 810 can range in size from 3,750×5,000 pixels to 17,008×11,304 pixels, or can be larger or smaller. The data set represented by the table 800 can include, for example, 174 photograph and line drawing pairs.

To produce consistency between the line drawings 812 of the table 800, artists can have been instructed with regard to elements such as textures and foliage. For example, artists may have been instructed to ignore all textures, or to draw a texture when the texture was in the foreground or otherwise significant in the scene. As another example, artists may have been instructed to outline foliage such as trees and bushes.

In some examples, one instance of the generator network or the combined generator and restorer networks can be trained on the data set represented by FIG. 7 and a different instance can be trained on the data set represented by FIG. 8. In these examples, the first instance can specialize in generating line drawings of faces and bodies, and the second instance can specialize in generating line drawings of architectural scenes. In some examples, the generator network or the combined generator and restorer networks can be trained on both data sets represented by FIGS. 7 and 8. In some examples, the one or combine neural networks can further be trained on additional data that includes images other than of people and buildings, such as vehicles, landscapes, animals, sporting events, and so on.

Training a neural network can include computing the difference between the output of the neural network, which can be referred to as a prediction (e.g., because the neural network is predicting a result that would be produced by a human), and the target result, which can also be referred to as the ground truth. The difference can be computed, for example, using a loss function or cost function. For example, a weighted loss, $\mathcal{L}_{WL1}$, can be computed as follows, where a is a matrix representing the predicted image and b is a matrix representing the target image:

$$\mathcal{L}_{WL1}(a,b)=|(a-b)\odot(1+\gamma(1-b))| \qquad \text{Eq. (1)}$$

In Equation 1 above, weighted hyper-parameter γ is applied to the predicted image matrix. The weighting hyper-parameter can control how much importance is given to lines over white space. When γ is equal to zero, Equation (1) produces the mean absolute error between a and b. The matrix that results from applying γ to is then multiplied to a matrix produced by subtracting the predicted image from the target image.

The loss function of Equation 1 can be applied to the generator network by using the output of the generator network, G(x), as the predicted image and the line drawing y that corresponds to x as the target image, according to the following equation, which computes the weighted loss of the baseline model:

$$\mathcal{L}_{base}=\mathcal{L}_{WL1}(G(x),y) \qquad \text{Eq. (2)}$$

The results from Equation 2 can be used as feedback to train the generator network.

In some examples, an optimized version of the generator network can be produced according to the following equation:

$$G^* = \underset{G}{\operatorname{argmin}} \mathbb{E}_{(x,y)\sim D}\mathcal{L}_{base}(G(x), y) \qquad \text{Eq. (3)}$$

In Equation 3, the best weights that may be achievable for performing the task of the generator network can be determined by minimizing the loss indicated by $\mathcal{L}_{base}$, where, as noted in Equation 2, the loss function compares the output of the generator network against the expected output. The optimization of Equation 3 can be performed, for example, by doing a gradient descent using back propagation, or another type of optimization method.

The loss function of Equation 1 can also be applied to the combined output of the generator and restorer network, R(G(x), y), according to the following equation, which computes what is referred to herein as an auxiliary loss:

$$\mathcal{L}_{aux}=\mathcal{L}_{WL1}(R(G(x)),y) \qquad \text{Eq. (4)}$$

The results from Equation 4 can be used as feedback to train the combined generator an restorer networks. The auxiliary loss function can be used to stabilize the training.

As noted above, the restorer network can be trained separately on synthetically deteriorated line drawings, produce by modifying or corrupting line drawings that represent target images. A deteriorated line drawing y can be $y^* \in \mathbb{R}^{1 \times W \times H}$.

Various different algorithms can be applied to they images to produce the y* images. For example, fading can be applied using the equation $$y^* = \frac{y + \sigma}{1 + \sigma},$$

where $\sigma \in [0.0, 1.0]$, which can result in white pixels being left unmodified and black pixels being changed to a shade of grey. As another example, parts of the line drawing can be blurred by applying a two-dimensional Gaussian filter with the standard deviation $\sigma \in [0.0, 1.0]$. As another example, random areas of the line drawing can be filled with pixels. For example, 10 to 50 areas ranging in size from 16×16 pixels to 40×40 pixels can be randomly selected (in terms of quantity, size, and location), and/or 100 to 500 areas ranging in size from 2×2 pixels to 16×16 pixels can be selected. In this example, for each selected area, a random operation can be performed, such as fading, turning pixels white, or generating a texture t according to $y^* = \sigma y + (1-\sigma)t$, where $\sigma \in [0.0, 1.0]$. In this latter case, the texture can be randomly cropped from a texture (such as a cloud texture) that can be generated by an image editing tool. In some examples, the y* images can be generated during training, with the manipulations described above applied and/or combined in a random manner.

The loss function of Equation 1 can also be applied to the output of the restorer network when training the restorer network on the deteriorated images, y*, which is referred to as the restorer loss:

$$\mathcal{L}_{res} = \mathcal{L}_{WL1}(R(y^*), y) \quad \text{Eq. (5)}$$

The results from Equation 5 can be used as feedback when training the restorer network on the deteriorated image data set.

In some examples, multi-task learning can be employed to jointly improve the performance of the extraction and refinement process. Multi-task learning can include training the generator network and the combined generator and restorer networks on x and y at the same time as training the restorer network on y*. A joint loss function can be computed as follows:

$$\mathcal{L}_{joint} = \mathcal{L}_{base} + \alpha \mathcal{L}_{aux} + \beta \mathcal{L}_{res} \quad \text{Eq. (6)}$$

In Equation 6, $\alpha$ and $\beta$ are hyper-parameters.

In some examples, an optimized version of the combined generator and restorer networks can be produced according to the following equation:

$$G^*, R^* = \underset{G,R}{\mathrm{argmin}} \mathbb{E}_{(x,y,y^*) \sim D} \mathcal{L}_{joint} \quad \text{Eq. (7)}$$

In Equation 4, the best obtainable weights for performing the task of the combined generator and restorer networks can be determined by determining which networks will minimize the expected value of the joint loss function, $\mathcal{L}_{joint}$. This joint optimization can be performed, for example, using back-propagation, where the differences between the expected outputs and actual outputs are back-propagated through the network, and weights are updated so that errors or differences between the expected and actual outputs are minimized. In various examples, the optimization is performed using many images so that the expected value of the cost will be minimized.

In some examples, the optimized, combined generator and restorer networks, as described by Equation 7, were jointly trained for 10,000 iterations with a learning rate of $1.0 \times 10^{-4}$ and a batch size of 4. For the data set represented by FIG. 7, the hyper-parameter was set to $\gamma=2$ and for the data set FIG. 8 the hyper-parameter was set to $\gamma=0$. The hyper-parameters for Equation 6 were set to $(\alpha, \beta)=(0.1, 10.0)$.

In some examples, performance of the generator can further be improved by pre-training the first phase of the generator network. For example, the first phase can be trained for object recognition and/or segmentation using available data sets for object recognition, such as the ImageNet database. As an example, the first phase can be trained for facial recognition and/or segmentation. In this example, the first phase can be separated from the second phase, and can be trained independently on this data set. After the first phase is trained, the combined first and second phases can be trained on the $D_{train}$ data set. With the pre-training, the first phase may need little adjustment, and can produce input for the second phase that may be relatively accurate, in terms of object identification and/or segmentation. The training can thus focus on adjusting the second phase, which may be trained more quickly and more accurately.

In some examples, Equation 3, as described above, was applied when pre-training the generator network. The generator network was trained for 30,000 iterations with a learning rate of $1.0 \times 10^{-3}$ with a batch size of 8.

The training data set, $D_{train}$, may be small, due to the difficulty of obtaining the line drawings y. In some examples, the training data set can be augmented by duplicating some photograph and line drawing pairs, and applying modifications to the copies. For example, the copied pair can be scaled (e.g., between a range of 0.5 to 1.5, of the original size, or another range), mirrored, rotated (e.g., between a range of −0.25 to 0.25 from the original orientation, or another range), and/or cropped (e.g. to 384×384 or another size). Alternatively or additionally, the contrast, saturation, hue, and/or brightness of the copied photographs can be modified.

Producing line drawings for architectural scenes can be particularly time consuming. In some examples, the data set can thus be enlarged by generating photographs from three-dimensional models of various cities. The three-dimensional models can be processed to produce an outline of the contours in the model. This process may produce mismatches between the photograph and the corresponding line drawing, which can be corrected by a human artist. Alternatively or additionally, the errors can be indicated using mask annotations $m \in \mathbb{R}^{1 \times W \times H}$, where m indicates whether a position is valid or invalid (e.g., using a value of 1 or 0, respectively). In some examples, the data set represented in FIG. 8 can include 92 photograph and line drawing pairs generated in this fashion, and 82 photograph and line drawing pairs where the line drawing was generated by a human artist.

In some examples, to include the mask annotations, the weighed loss function can be modified as follows:

$$\mathcal{L}_{WL1}(a,b,) = |m \odot (a-b) \odot (1+\gamma(1-\beta))| \quad \text{Eq. (8)}$$

In some examples, training of the restorer network and/or the combined generator and restorer networks can be augmented through use of the Generative Adversarial Networks (GANs) technique. In these examples, a separate network (referred to as the determinative network) can be configured for recognizing whether an input line drawing was produced by a human or a machine. The result from the determinative network can be fed back to the restorer or combined networks, whose training objective is to increase the error rate of the discriminative network (e.g., to "fool" the determinative network into determining that line drawings produced by the restorer or combined networks were produced by a human).

When performing inference, the automated system for producing line drawings (e.g., the combined generator and restorer networks) can take as input a photograph of any size. Table 3 below illustrates examples of execution times of the system on images of various sizes.

TABLE 3

| Image Size | Pixels | Time (s) |
|---|---|---|
| 512 × 512 | 262,144 | 0.05 |
| 1024 × 1024 | 1,048,576 | 0.14 |
| 2048 × 2048 | 4,194,304 | 0.52 |
| 4096 × 3072 | 12,582,912 | 1.57 |

In various examples, a user of the automated system for producing line drawings can influence the output by modifying the input photograph. For example, when the user reduces the scale (e.g., by down-scaling), of the input photograph, system may produce fewer fine details. As another example, the user can select an area of the photograph and apply a filter that blurs the area, so that the area appears out of focus. In this example, the system may ignore the blurred area, and produce no lines in the area. As another example, an image editing tool that includes the automated system for producing line drawings may enable a user to select an area where the line drawing is to be applied, and/or to select an area where the line drawing is not to be applied.

Figure 9B:
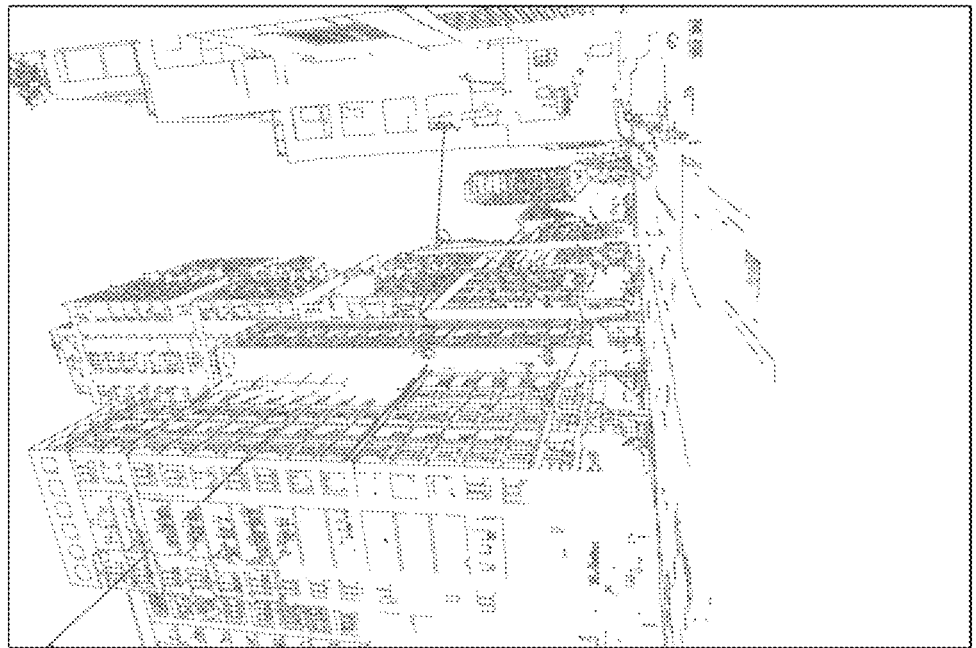
FIGS. 9A-9D illustrate example results from inputting an example photograph into different systems for automated generation of line drawings.
Figure 9A:

FIGS. 9A-9D illustrate example results from inputting an example photograph 910 into different systems for automated generation of line drawings, including the technique discussed above. FIG. 9A illustrates the example photograph 910 that was used as input into three different systems.

FIG. 9B illustrates the output 902 of Pix2pix, a system that uses conditional adversarial networks for image-to-image translation. Pix2Pix uses adversarial learning to learn an input-to-output mapping and also a loss function to achieve this mapping.

Figure 9D:
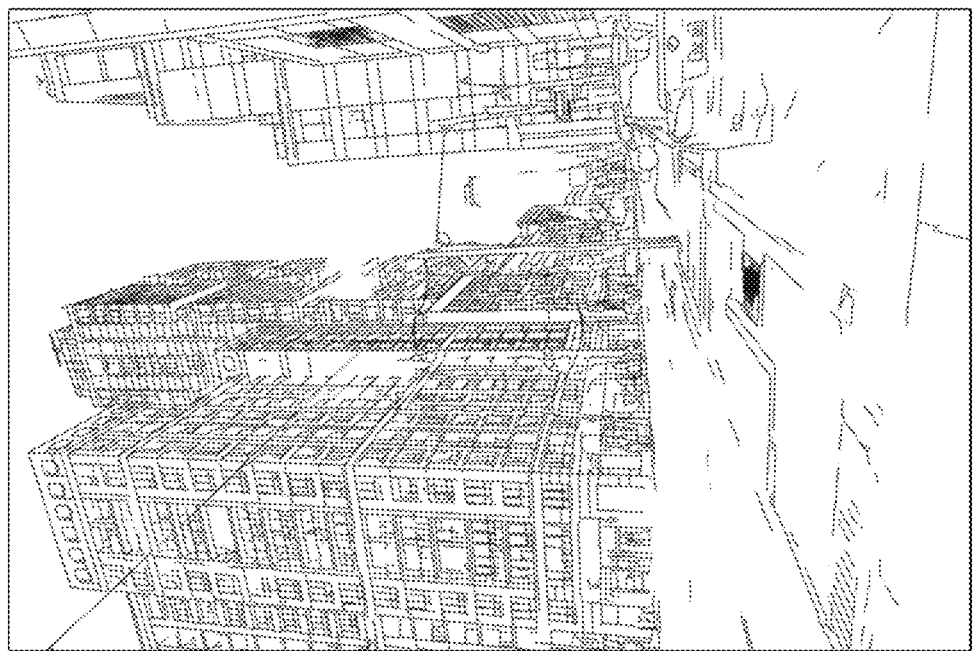
Figure 9C:
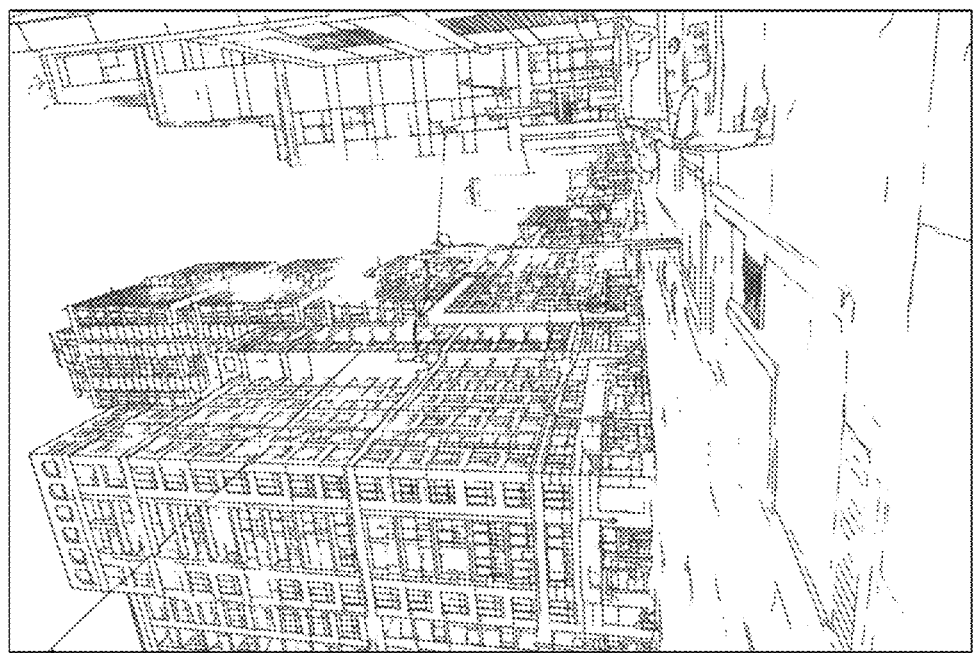

FIG. 9C illustrates the output 904 of Canny, an edge detector.

FIG. 9D illustrates the output 906 of the generator and restorer networks discussed above.

Figure 10A:
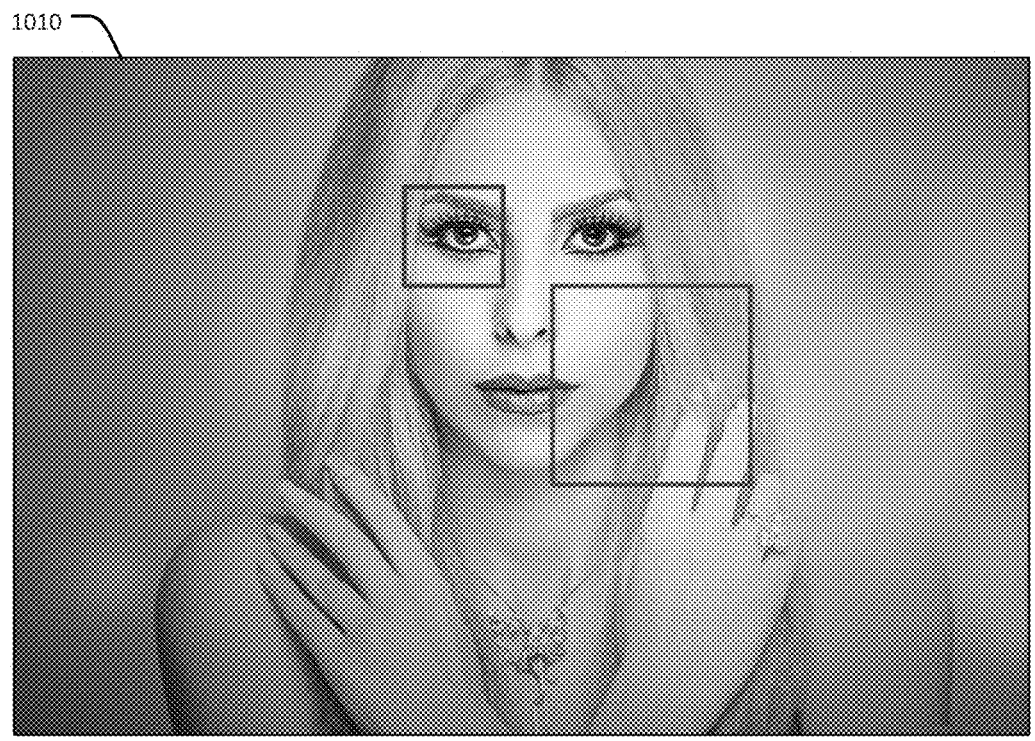
FIGS. 10A-10D illustrate example results from inputting an example photograph into different systems for automated generation of line drawings.

FIGS. 10A-10D illustrate example results from inputting an example photograph 1010 into different systems for automated generation of line drawings. FIG. 10A illustrates the example photograph 1010 that was used as input into three different systems.

Figure 10B:
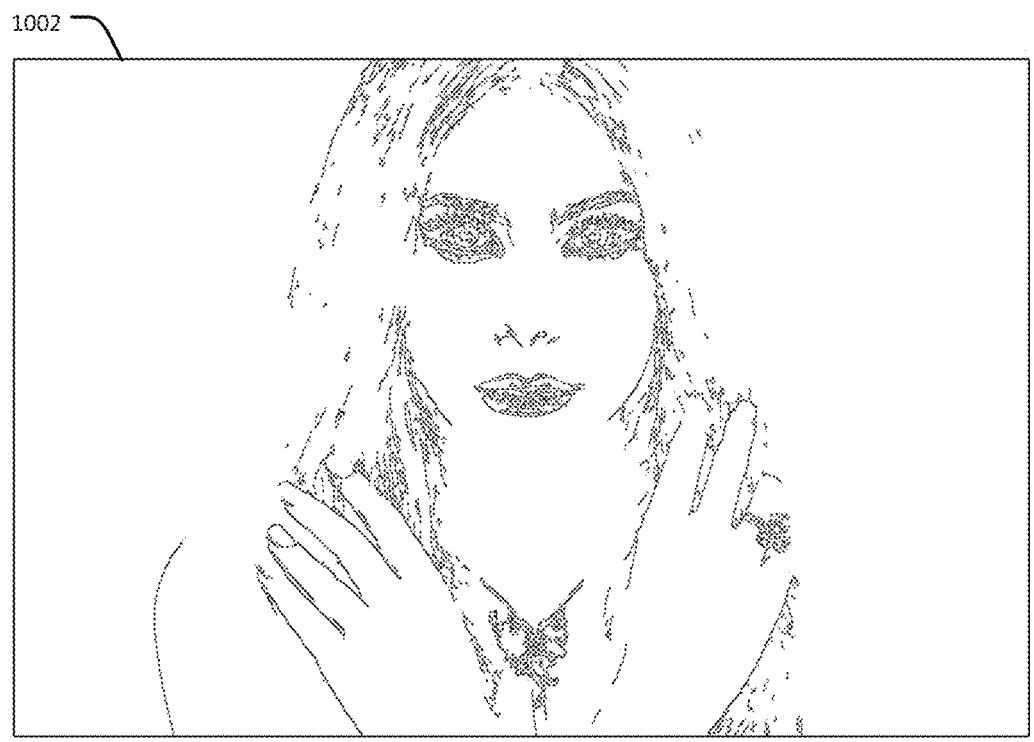

FIG. 10B illustrates the output 1002 of Pix2pix.

Figure 10C:

FIG. 10C illustrates the output 1004 of Canny, an edge detector.

Figure 10D:

FIG. 10D illustrates the output 1006 of the generator and restorer networks discussed above.

In some cases, Canny is sensitive to global illumination, tends to produce texture-like lines, and sometimes ignores most lines in a shadowed region. Pix2pix does not have these issues, but produces too many short and undesired lines, noise and lines with inconsistent intensity.

The output of the automated system for generating line drawings can be used in various applications, such as for the production of comic books (such as manga-style comic books) and coloring books.

In various examples, a manga-style comic book panel can include at least two layers: a line drawing and a halftone screen. The line drawing provides the background for the panel. The halftone screen can include a pre-defined pattern that includes visual effects, such as textures and shadows. The artist may produce the line drawing by copying a scene from a photograph, but can save considerable time by inputting the photograph into the automated system for generating line drawings. Once the artist has the automatically generated line drawing, the artist can add or remove lines, and/or add stylistic changes. The artist can then add the halftone screen layer to express fine details.

A coloring book is a is a book with line drawing images that a user can add color to, using media such as pencils, crayons, and/or paints, among other examples. In a digital coloring book, the user can add color by selecting areas for filling with a selected color. Production of coloring books can be expedited through the use of the automated system for generating line drawings.

In some examples, the output of the automated system for producing line drawings can be used for further editing, such as converting the image into a vector format. Various techniques can be used to convert a pixel-based image to a vector based image. These techniques can enable a user to adjust the fidelity of the vectorized image, as well as the simplicity or complexity of the resulting image.

Figure 11:
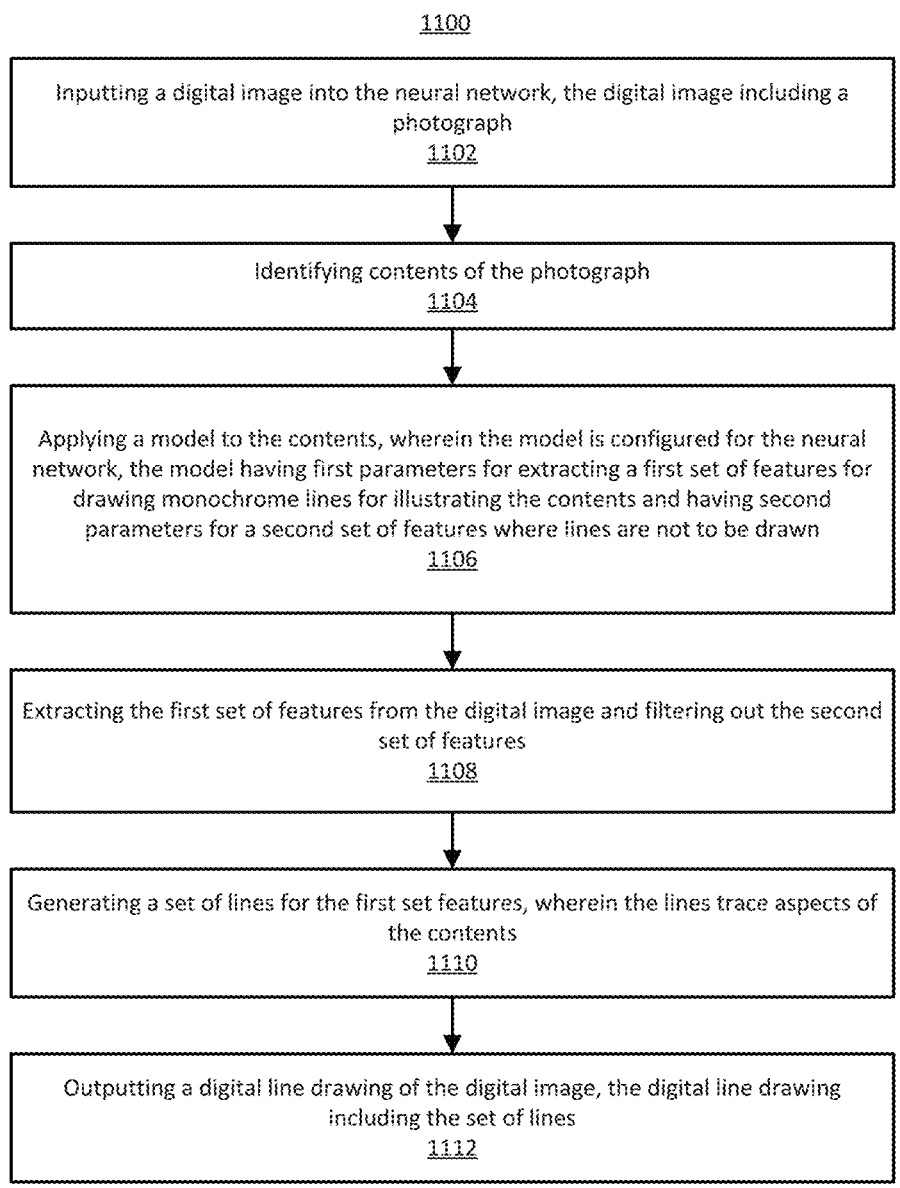
FIG. 11 includes a flowchart that illustrates an example of a process for automated generation of line drawings.

FIG. 11 includes a flowchart that illustrates an example of a process 1100 for automated generation of line drawings. The example process 1100 can be performed, for example, by a computing device that includes one or more processors and a non-transitory computer-readable medium including instructions that, when executed by the one or more processors, cause the one or more processors to perform operations including the steps of the process 1100. Alternatively or additionally, a non-transitory computer-readable medium can have stored thereon instructions that, when executed by one or more processors of a computing device, cause the one or more processors to perform the operations of the process 1100. In various examples, the computing device executes a neural network that can be used in performing the steps of the process 1100.

At step 1102, the process 1100 includes inputting a digital image into the neural network, the digital image including a photograph. In some examples, the digital image is input into the neural network for training of the neural network. In some examples, the digital image is input for performing inference on the digital image; that is, for producing a line drawing of the contents of the image.

At step 1104, the process 1100 includes identifying the photograph. The contents can include objects, combinations of objects, textures, edges, gradients, contours, and/or other aspects of the photograph. In some examples, the object includes a part of a person or an architectural structure. In some examples, the photograph is of an outdoor scene or a building interior.

In various examples, the neural network is trained on a data set including digital photographs and digital line drawings of the digital photographs. the digital line drawings can include lines for edges and specific features of objects in the digital photographs. For example, lines for the specific features can aid in recognizing the objects. As another example, lines for the specific features provide shape or definition to parts of the objects. In some examples, the specific features include texture when the objects are in foregrounds of the digital photographs. In some examples, the specific features exclude textures.

In some examples, the process 1100 can further include inputting output from the neural network into a second neural network. In these examples, the second neural network can be trained to remove digital artifacts from a greyscale digital image and output a two-tone digital image. Two-tone, in this context, means that the background of the output digital image is one color (e.g., white, or another color), which in most cases is uniform, and the lines drawn to illustrate the contents of the photograph are a second color (e.g., black, or another color). The lines may be uniformly one color, or may include gradients of the one color, such as at the edges of the lines. In some examples, the second neural network is trained separately from the neural network on a data set of line drawings and copies of the digital line drawings, where the copies include digitally added artifacts. In these examples and other examples, the second neural network can output the digital line drawing.

At step 1106, the process 1100 includes applying a model to the contents, where the model is configured for the neural network. The model can have first parameters for extracting a first set of features for drawing monochrome lines for illustrating the contents. The model can further have second parameters for a second set of features where lines are not to be drawn.

At step 1108, the process 1100 includes extracting the first set of features from the digital image and filtering out the second set of features. The first set of features can includes edges of an object in the photograph, textures of the object, and/or aspects of an object that aid in identifying the object or provide shape and/or definition to the object. The second set of features can include textures of the object and or fine details that the model determines should be ignored.

At step 1110, the process 1100 includes generating a set of lines for the first set features, wherein the lines trace aspects of the contents. The set of lines can be substantially uniform in width (e.g., not exceeding a minimum of 1 pixel in width and a maximum of 2 pixels in width, or being only 2 pixels in width, among other examples), and/or can have a minimum length.

At step 1112, the process 1100 includes outputting a digital line drawing of the digital image, the digital line drawing including the set of lines. The digital line drawing is a two-tone digital image, the set of lines being a first tone and a background being a second tone, and wherein the set of lines are substantially uniform in width.

Figure 12:
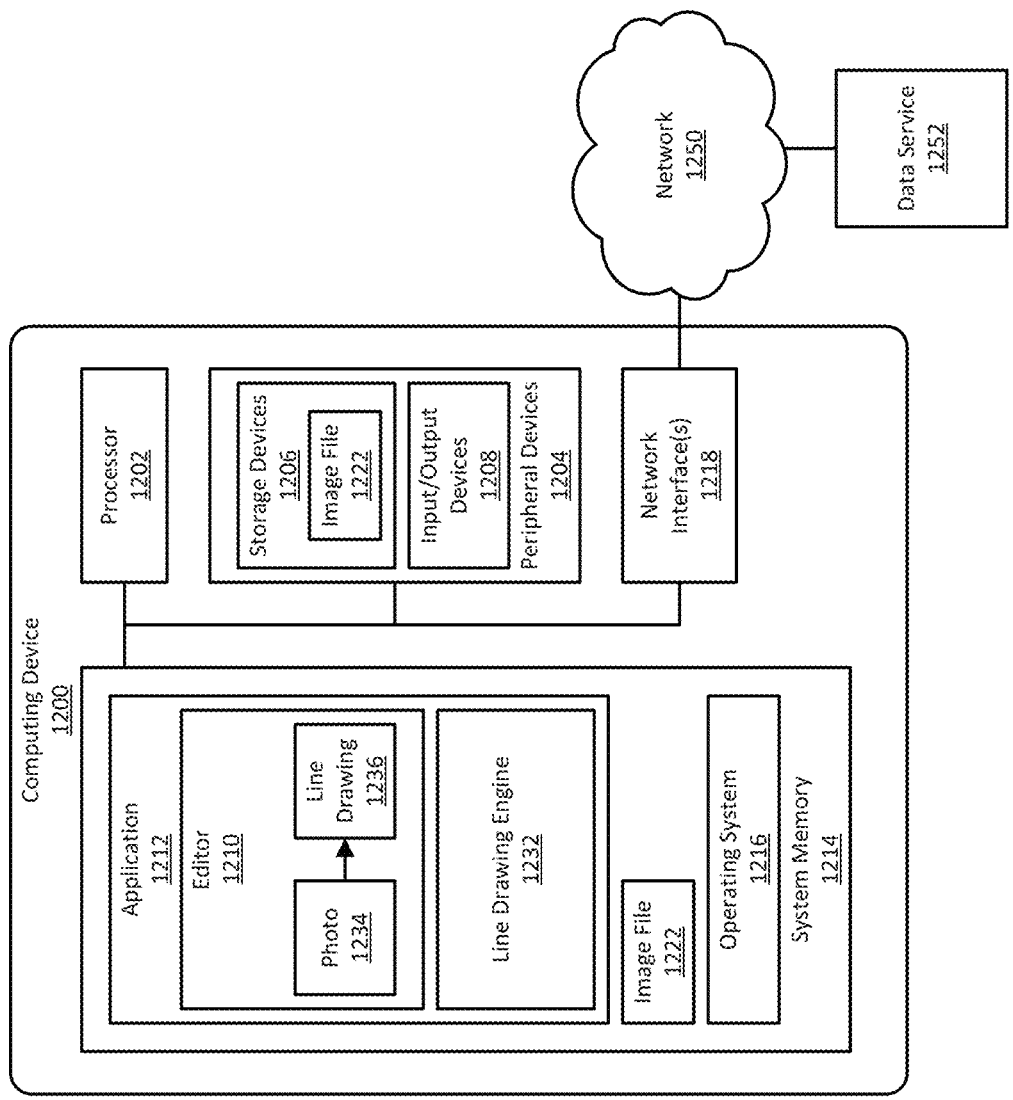
FIG. 12 includes a block diagram illustrating an example of a computing device.

FIG. 12 includes a block diagram illustrating an example of a computing device 1200 on which an image editing program the implements an automated system for generating line drawings can be executed. The computing device 1200 can be, for example, a desktop computer, a laptop computer, a tablet computer, or a smartphone, among other examples. The example computing device 1200 can include various hardware components, including a processor 1202, a system memory 1214 (which can also be referred to as processor memory or main memory), peripheral devices 1204, and one or more network interfaces 1218, among other examples. When in operation, the computing device 1200 can also include software components, such as an operating system 1216 and an application 1212. The computing device 1200 can also include software components when not in operation, such as software stored as firmware on other memory devices in the computing device 1200, and/or software stored on storage devices 1206, among other examples.

The processor 1202 is an integrated circuit device that can execute program instructions. The program instructions can be for executing an operating system 1216 and/or an application 1212. When executed by the processor 1202, the instructions cause the processor 1202 to perform the operations of the program. When being executed by the processor 1202, the instructions are stored in the system memory 1214, possibly along with data being operated on by the instructions. The system memory 1214 can be a volatile memory storage type, such as a Random Access Memory (RAM) type. The system memory 1214 is sometimes referred to as Dynamic RAM (DRAM) though need not be implemented using a DRAM-based technology. Additionally, the system memory 1214 can be implemented using non-volatile memory types, such as flash memory.

The peripheral devices 1204 can include various hardware components that can add functionality to the computing device 1200. In the example of FIG. 12, the peripheral devices 1204 include storage devices 1206 and input/output devices 1208. The storage devices 1206 can include non-volatile storage devices, such as optical or magnetic disks, or solid state drives, among other examples. The storage devices 1206 can be internal (e.g., mounted within the same chassis as the other illustrated components) or external (e.g., in a separate enclosure and connected to the computing device 1200 using a cable. In some examples, the storage devices 1206 can be located on the network 1250. The input/output devices 1208 can include various devices and/or connectors for devices that enable information to be displayed to a user, and for the use to input data into the computing device 1200. For example, the input/output devices 1208 can include display devices (e.g., screens or monitors), speakers, headphones, and/or printers, among other examples. The input/output devices 1208 can further include keyboards, mice, touchscreens, digitizing tablets, microphones, motion sensors, and scanners, among other examples. The peripheral devices 1204 can include other devices not illustrated here, such as a graphics accelerator.

The network interfaces 1218, which are also a type of peripheral device, enable the computing device 1200 to communicate with a network 1250. The network interfaces 1218 can include, for example, a socket for connecting a network cable and/or one or more antenna for communicating with wireless networks. When the network interfaces 1218 include more than one interface, the computing device 1200 may be able to communicate with different networks at the same time. The network 1250 can include private (e.g., firewalled and accessible only with authentication credentials) networks and/or public networks, such as the Internet.

The operations of the computing device 1200 can be coordinated and controlled by the operating system 1216. The operating system 1216 can, for example, cause the processor 1202 to load and execute applications activated by a user, such as the example application 1212 illustrated in FIG. 12. As a further example, the operating system 1216 can control access to and use of the hardware of the computing device 1200 by applications executing on the computing device 1200.

The example application 1212 of FIG. 12 can be an image editing program that includes an automated system for generating line drawings, implemented in this example as a line drawing engine 1232. The application 1212 thus includes an editor 1210 in which a user can load an image for editing. The image may be loaded form an image file 1222 stored on one of the storage devices 1206 of the computing device 1200. Alternatively, the image file 1222 may be loaded over the network interfaces 1218 from a network location. Once loaded, the image file 1222 for the image may also be present in the system memory 1214.

The image file 1222 can include a photograph 1234, which, once the image file 1222 is loaded into the editor 1210, can be viewed in the editor 1210. In various examples, the editor 1210 can include a tool, an option, a menu, or another on-screen control that enables the user to input the photograph 1234 into the line drawing engine 1232. The line drawing engine 1232 can include a neural network, such as the generator network discussed above, which has been trained to identify objects in the photograph 1234, as well as features of the objects, and to produce a line drawing 1236 that includes lines for the objects. In some examples, the line drawing engine 1232 includes a first neural network (e.g., the generator network) that is trained for object segmentation and for producing a line drawing, and a second neural network (e.g., the restorer network discussed above) that is trained for removing digital artifacts from a greyscale image and output a line drawing that includes primarily lines and substantially no stray pixels, shaded areas, or very short lines.

In some examples, the line drawing engine 1232 is a component of the application 1212, and executes on the example computing device 1200 along with the application 1212. In some examples, some or all of the line drawing engine 1232 can be provided by a data service 1252 that is available over the network 1250. For example, the data service 1252 can provide object recognition and segmentation, such as is provided by the generator network. As another example, the data service 1252 can be given the photograph 1234, and can send back the line drawing 1236.

Figure 13:
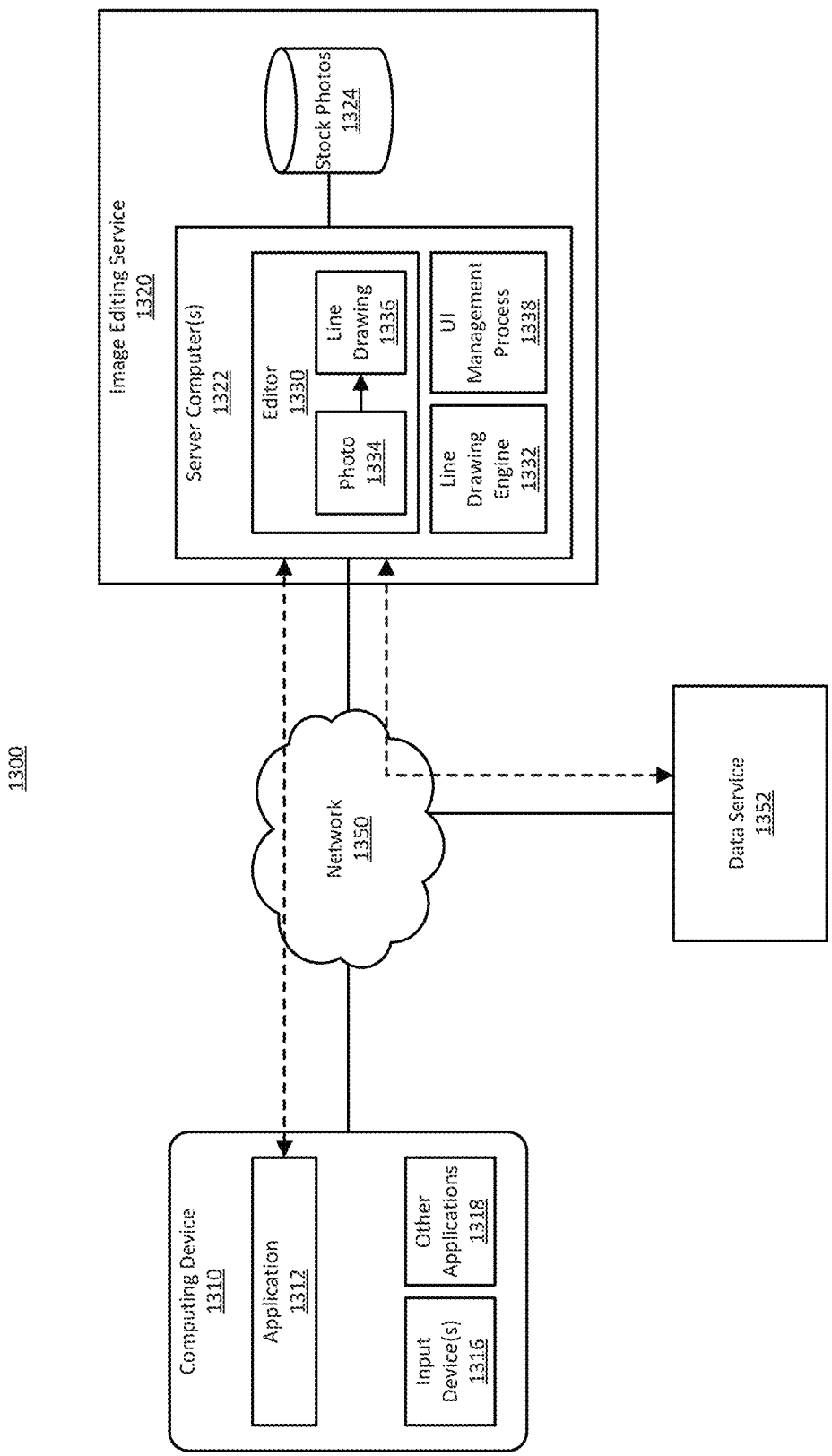
FIG. 13 is a diagram illustrating an example of an image editing system.

FIG. 13 is a diagram illustrating an example of an image editing system 1300, which can be used to edit images on a computing device 1310. In various examples, the image editing system 1300 includes an image editing service 1320 that can provide image editing services to computing devices, such as a computing device 1310 illustrated in FIG. 13. In various examples, the image editing service 1320 can communicate with the computing device 1310 over a network 1350, which can include private networks and/or public networks such as the Internet. In some examples, the image editing service 1320 can optionally communicate over the network 1350 with a data service 1352 that can assist in the production of line drawings.

The computing device 1310 of this example can include various types of electronic devices that include a microprocessor capable of executing instructions of computing code, memory for storing the instructions and/or other data, and network capability, such as a wired or wireless network card and/or a cellular antenna. Examples of such electronic devices include laptop computers, desktop computers, tablet computers, smart phones, personal digital assistants, smart watches, digital eyeglass systems, internet televisions, game consoles, and others.

The computing device 1310 can be associated with one user or multiple users. A user, in this context, is a digital entity that is maintained by a computing system, and for which various types of digital identifiers may exist that associate data with the user. For example, a user can be identified to a computing system by a username, which can be an alphanumeric string. In this example, the username can be associated with a user account on the computing system and/or on a network. The user account can further be associated with authentication data, such as a password, a security token, bioinformatic data, or other data that can be used to give a person access to the account, or to give the account access to the computing system. As another example, a user can be identified by an email address, a social media handle (e.g., a type of username), a gaming handle, a mobile telephone number, or another type of identifier. In some examples, one user can be associated with multiple user accounts. In some examples, one user can be associated with multiple email addresses, social media handles, or other identifiers. In some examples, more than one person (e.g., a human being) can be associated with the same user. For example, a team of network administrators may each have access to the same user account.

In various examples, the computing device 1310 can include hardware and software that enable the computing device 1310 to interact with the image editing service 1320 so that a user can make use of the image editing operations of the image editing service 1320. For example, the computing device 1310 can execute an application 1312 through which a user can interact with the image editing service 1320 to edit an image. The application 1312 can be one provided by the image editing service 1320. The application 1312 can include a graphical user interface that can be output using a display of the device 1310, and through which a user can view an image. The application 1312 can further enable access to the editing capabilities of the image editing service 1320. The computing device 1310 can further include input devices 1316, such as a mouse, a trackpad, a keyboard, a digitizing tablet, a touchscreen, and/or microphones, that enable the user to perform editing operations. In various examples, other applications 1318 can also be executing on the computing device 1310.

In various examples, the image editing service 1320 can be implemented using various software processes executing on or more server computers 1322. The software processes can include, for example, an editor 1330, a line drawing engine 1332, and a user interface (UI) management process 1338, among others. The image editing service 1320 can further include one or more data stores to store data such as stock photos 1324, among other data. The data stores can be implemented using, for example, hard drives, solid state drives, or another form of non-volatile storage memory.

The server computers 1322 on which the processes execute can be computing devices that include one or more processors capable of executing program instructions and memory for storing the program instructions. The server computers 1322 and the data stores can, for example, be housed in a data center and/or provided as a service from a data center. Alternatively or additionally, the server computers 1322 and the data stores can be housed in a network operated and controlled by the image editing service 1320.

The editor 1330 can enable a user to edit a digital image, such as a digital photograph 1334. In some examples, the user can provide the photograph 1334 by inputting a file containing the photograph 1334 into the application 1312. In some examples, the user can obtain the photograph 1334 from the data store of stock photos 1324.

In various examples, the editor 1330 can include a tool, an option, a command, a menu, or another on-screen control that enables the users to input the photograph 1334 into the line drawing engine 1332. The line drawing engine 1332 will then output a line drawing 1336, which the user can view through the editor 1330. The line drawing engine 1332 can include a neural network, such as the generator network discussed above, which has been trained to identify objects in the photograph 1334, as well as features of the objects, and to produce a line drawing 1336 that includes lines for the objects. In some examples, the line drawing engine 1332 includes a first neural network (e.g., the generator network) that is trained for object segmentation and for producing a line drawing, and a second neural network (e.g., the restorer network discussed above) that is trained for removing digital artifacts from a greyscale image and to output the line drawing 1336.

In some examples, some operations of the line drawing engine 1332 can be supported by the data service 1352. For example, the data service 1352 can provide computational resources for executing the one or more neural networks included in the line drawing engine 1332. As another example, one or both of the neural networks included in the line drawing engine 1332 can be executed at the data service 1352. In some examples, the data service 1352 can be another source for stock photos that a user can edit through the image editing service 1320.

The user interface management process 1338 can manage the transfer of data between the image editing service 1320 and the user interface of the application 1312, so that user does not experience delay while using the application 1312. For example, the user interface management process 1338 can coordinate the user's input into the application 1312 with actions taken by the editor 1330 in response to the input. The image editing service 1320 can further include other processes that are not illustrated here.

Figure 14:
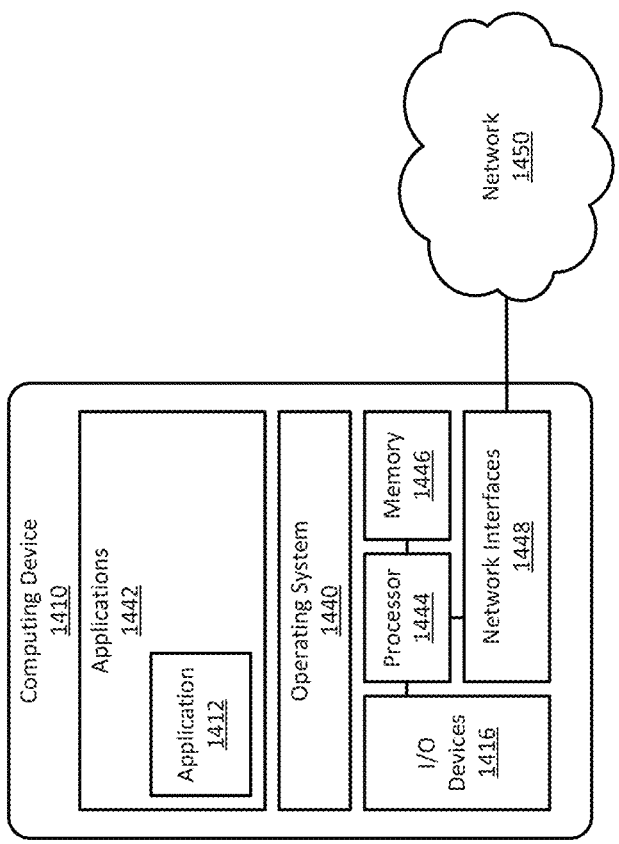
FIG. 14 includes a block diagram illustrating an example of a computing device.

FIG. 14 includes a block diagram illustrating an example of a computing device 1410, such as the computing device illustrated in FIG. 13. The example computing device 1410 of FIG. 14 can include various software components and software components, which can be used in various combinations to access an image editing service from the computing device 1410.

In various examples, the software components can include an operating system 1440 and applications 1442. The operating system 1440 can manage the various operations of the computing device 1410, including the applications 1442 executing on the computing device 1410 and the computing device's hardware. The applications 1442 can include programs accessible to a user of the computing device 1410, including a delivery application 1412, through which the user can interact with the image editing service.

In various examples, the hardware components can include a processor 1444, memory 1446, Input/Output (I/O) devices 1416, and network interfaces 1448, among other components. The processor 1444 can be an integrated circuit device that is operable to execute program instructions, including the instructions for executing the operating system 1440 and the applications 1442. The memory 1446 can store the program instructions while the processor 1444 is executing the instructions, and/or while the computing device 1410 is powered off. In various examples, the computing device 1410 can include multiple memories, including volatile and/or non-volatile memories. Non-volatile memories can also be described as non-transitory. The I/O devices 1416 can include user input and output devices, such as display screens, touch screens, keyboards, mice, and so on. The I/O devices 1416 can further include location devices, such as a Global Positioning System (GPS) receiver. The network interfaces 1448 can include wired and/or wireless network devices, such as a network port, a Wi-Fi antenna, and/or cellular antennas, among other examples. The network interfaces 1448 can enable the computing device 1410 to communicate with a network 1450, including, for example, the Internet.

Figure 15:
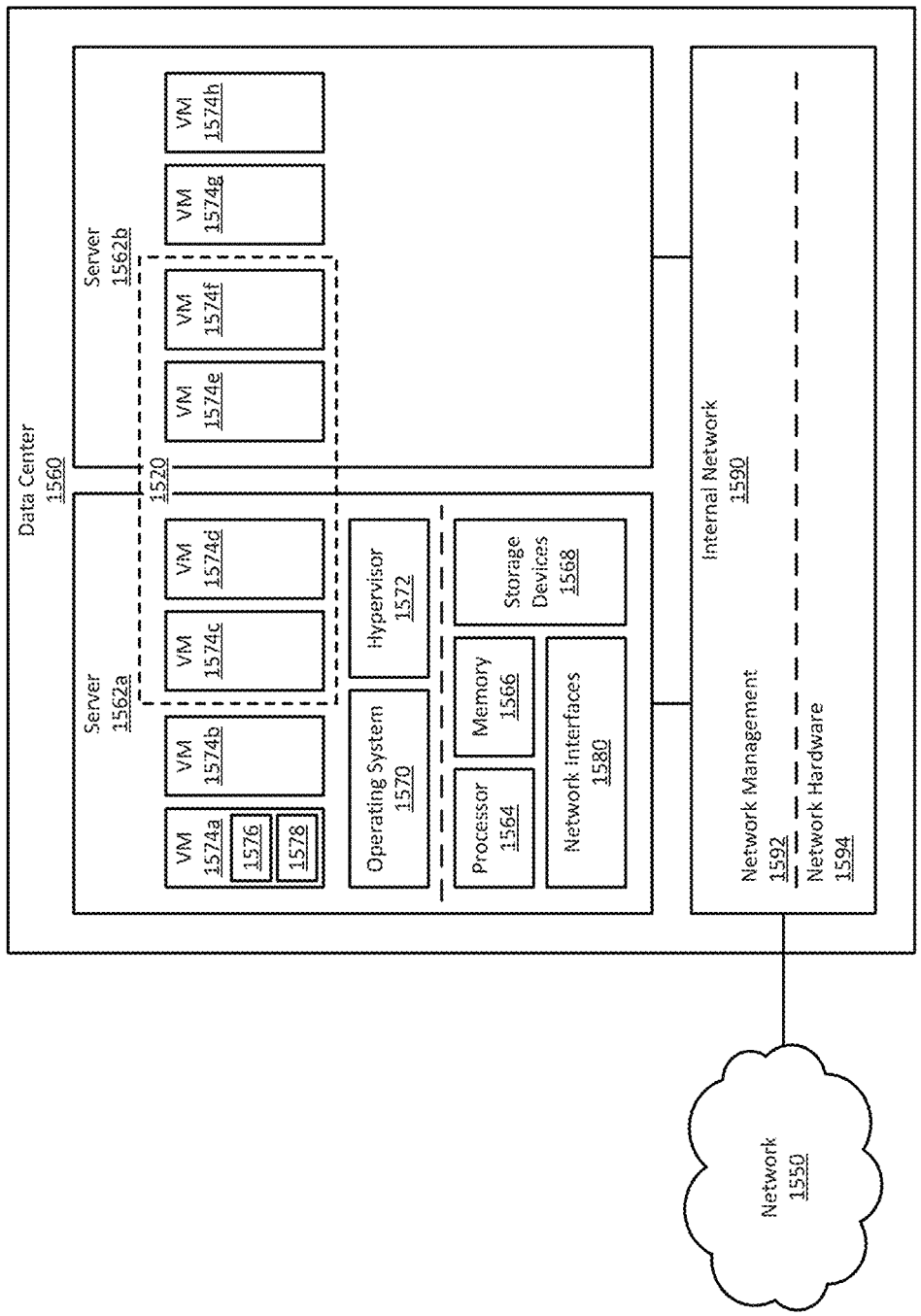
FIG. 15 includes a block diagram illustrating an example of a data center.

FIG. 15 includes a block diagram illustrating an example of a data center 1560, which can host an image editing service 1520, such as the image editing service illustrated in FIG. 14. The data center 1560 of FIG. 15 can be operated by an entity other that the entity that controls the image editing service 1520, and may be leasing resources to the operator of the image editing service 1520. Alternatively, the data center 1560 may be operated by the entity that controls the image editing service 1520.

The data center 1560 can include multiple servers 1562a-1562b, of which two are illustrated here. A server can be a computing device configured primarily for being accessed over a network, and possibly for simultaneous use by multiple, unrelated users. An example of a configuration of a server is illustrated by a first server 1562a in FIG. 15. As illustrated by the first server 1562a, a server can include a software layer and a hardware layer.

The software layer can include, for example, an operating system 1570 a hypervisor 1572, and virtual machines 1574a-1574d, among other software and applications. The operating system 1570 can control and coordinate the operations of the first server 1562a, including execution of the hypervisor 1572, the virtual machines 1574a-1574d, and operation of the hardware. The hypervisor 1572, which can also be referred to as a kernel-based virtual machine (KVM) or a virtual machine monitor (VMM), can manage the virtual machines 1574a-1574d. For example, the hypervisor 1572 can handle operations such as bringing up new virtual machines, use of the virtual machines of the first server's hardware, and taking down virtual machines, among other operations. In some examples, the hypervisor 1572 is integrated into the operating system 1570.

A virtual machine is an emulated computer system running on the hardware of a physical computer system. As illustrated by a first virtual machine 1574a, a virtual machine can include a virtual representation of computer hardware 1578, which may but need not map to the physical hardware of the computing system on which the virtual machine is running. The virtual machine can further include software 1576 that is running on top of the virtual hardware 1578. The software 1576 can include an operating system and applications that are separate and distinct from the operating system 1570 and applications of the first server 1562a. As with physical computing systems, virtual machines can be isolated from one another, and a user operating within one virtual machine may be unaware of the existence of other virtual machines on the same system. The virtual machines 1574a-1574h illustrated in FIG. 15 can each have a similar configuration as is illustrated for the first virtual machine 1574a, with variations in the software executed and/or the particular configuration of the virtual hardware.

The hardware layer of the example first server 1562a can include a processor 1564, memory 1566, storage devices 1568, and a network interface 1580, among other hardware. The processor 1564 is an integrated circuit device operable to execute program instructions, including the instructions for the programs executing in the software layer of the first server 1562a. In some examples, the first server 1562a can include multiple processors. In some examples, a processor can include multiple processing cores. While the processor 1564 is executing program instructions, the program instructions can be stored in the memory 1566. In various examples, the memory 1566 can be volatile memory and/or non-volatile memory. In various examples, the first server 1562a can include multiple different memories. The storage devices 1568 can include non-volatile storage systems, such as hard drives, flash drives, and/or solid state drives, among other examples. While not being executed, and, in some cases, while being executed, program instructions can be stored on the storage devices 1568. The memory 1566 and the storage devices 1568 illustrate two examples of non-transitory computer-readable mediums. The network interfaces 1580 can include hardware and software for connecting the first server 1562*a* to a network, such as the internal network 1590 of the data center 1560. In some examples, the first server 1562*a* can include multiple network interfaces 1580 so that the first server 1562*a* can maintain multiple connections to the internal network 1590.

In various examples, other servers in the data center 1560, such as a second server 1562*b*, can be configured similarly to the first server 1562*a*, possibly with variations in the software being executed, the number of virtual machines running at any given time, and/or variations in the hardware included in the server.

The internal network 1590 of the data center 1560 can connect the servers 1562*a*-1562*b* of the data center 1560 to each other and to external networks 1550, such as the Internet. The internal network 1590 can include network management 1592 software, which can perform operations such as balancing the workload on each of the servers 1562*a*-1562*b*, bringing up and taking down servers, and/or assigning the data center's customers to servers and/or virtual machines on the servers, among other operations. The internal network 1590 can further include network hardware 1594, such as the routers, switches, hubs, and gateways that form the internal network 1590.

A customer of the data center 1560 can include the image editing service 1520. The image editing service 1520 can, for example, be assigned one or more virtual machines in the data center 1560, which the image editing service 1520 can use for executing the various processes of the image editing service 1520. The data center 1560 can be configured such that the operator of the image editing service 1520 need not know where the virtual machines assigned to the image editing service 1520 are executing. In the example of FIG. 15, the image editing service 1520 has been assigned several virtual machines executing on the first server 1562*a* and several executing on the second server 1562*b*. In various examples, the data center 1560 may determine to move the image editing service 1520 to different servers, and may thus migrate the operations of the image editing service 1520 from one virtual machine to another.

In various examples, the operator of the image editing service 1520 can access the virtual machines assigned to the image editing service 1520 from the network 1550. For example, the data center 1560 can provide a console or graphical user interface through which the operator can configure the virtual machines. In various examples, the data of the image editing service 1520 can be stored on the storage devices 1568 of the servers, and/or on network attached storage devices in the data center 1560.

The services of the image editing service 1520 can further be provided over the network 1550 to users. For example, the virtual machines assigned to the image editing service 1520 can each include a virtual network interface, through which the virtual machines can communicate with the network 1550. Communications can include receiving input, including images and instructions for editing the images, from user devices and/or transmitting updated versions of the images and/or results of performing the instructions to the user devices.

Specific details were given in the preceding description to provide a thorough understanding of various implementations of systems and components for an automated system for generating line drawings. It will be understood by one of ordinary skill in the art, however, that the implementations described above may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

It is also noted that individual implementations may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

The various examples discussed above may further be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable storage medium (e.g., a medium for storing program code or code segments). A processor(s), implemented in an integrated circuit, may perform the necessary tasks.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the implementations disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for automated generation of line drawings.

What is claimed is:

1. A computer-implemented method performed by one or more processing devices, the method comprising:
   inputting a digital image into a first neural network;
   generating, using the first neural network, a first digital line drawing based on contents of the digital image;
   inputting the first digital line drawing, rather than the digital image, into a second neural network;
   generating, using the second neural network, a second digital line drawing based on the first digital line drawing, wherein the second digital line drawing is a two-tone image and is different from the first digital line drawing; and
   outputting the second digital line drawing as a line drawing corresponding to the digital image.

2. The computer-implemented method of claim 1, wherein the second digital line drawing includes edges of objects in the digital image and one or more lines corresponding to specific features of the objects.

3. The computer-implemented method of claim 1, wherein the first digital line drawing is a greyscale digital image, and generating the second digital line drawing comprises removing, by the second neural network, one or more digital artifacts from the first digital line drawing and outputting the two-tone image.

4. The computer-implemented method of claim 3, wherein the second neural network is trained separately from the first neural network on a data set of line drawings and copies of the line drawings, wherein the copies of the line drawings include artifacts digitally added to the line drawings in the data set of line drawings, and the second neural network is trained to use the copies of the line drawings as input and output the line drawings.

5. The computer-implemented method of claim 1, wherein the first neural network is trained on a data set including digital images and digital line drawings of the digital images, and wherein the digital line drawings include lines for edges and specific features of objects in the digital images.

6. The computer-implemented method of claim 5, wherein lines for the specific features aid in recognizing the objects.

7. The computer-implemented method of claim 5, wherein lines for the specific features provide shape or definition to parts of the objects.

8. The computer-implemented method of claim 5, wherein the specific features include texture when the objects are in foregrounds of the digital images.

9. The computer-implemented method of claim 5, wherein the specific features exclude textures.

10. The computer-implemented method of claim 1, wherein the digital image depicts a part of a person or an architectural structure.

11. The computer-implemented method of claim 1, wherein the digital image comprises a photograph of an outdoor scene or a building interior.

12. The computer-implemented method of claim 1, wherein the second digital line drawing comprises a set of lines in a first tone and a background in a second tone, and wherein the set of lines are substantially uniform in width.

13. A computing device, comprising:
   one or more processors; and
   a non-transitory computer-readable medium including instructions that, when executed by the one or more processors, cause the one or more processors to perform operations including:
      inputting a digital image into a first neural network;
      generating, using the first neural network, a first digital line drawing based on contents of the digital image;
      inputting the first digital line drawing, rather than the digital image, into a second neural network;
      generating, using the second neural network, a second digital line drawing based on the first digital line drawing, wherein the second digital line drawing is a two-tone image and is different from the first digital line drawing; and outputting the second digital line drawing as, a line drawing corresponding to the digital image.

14. The computing device of claim 13, wherein the second digital line drawing includes edges of objects in the digital image and one or more lines corresponding to specific features of the objects.

15. The computing device of claim 13, wherein the first digital line drawing is a greyscale digital image, and generating the second digital line drawing comprises removing, by the second neural network, one or more digital artifacts from the first digital line drawing and outputting the two-tone image.

16. The computing device of claim 13, wherein the first neural network is trained on a data set including digital images and digital line drawings of the digital images, and wherein the digital line drawings include lines for edges and specific features of objects in the digital images.

17. The computing device of claim 13, wherein content of the digital image includes a part of a person or an architectural structure.

18. The computing device of claim 13, wherein the digital image is a photograph of an outdoor scene or a building interior.

19. A non-transitory computer-readable medium having stored thereon instructions that, when executed by one or more processors of a computing device, cause the one or more processors to perform operations including:

inputting a digital image into a first neural network;

generating, using the first neural network, a first digital line drawing based on contents of the digital image;

inputting the first digital line drawing, rather than the digital image, into a second neural network;

generating, using the second neural network, a second digital line drawing based on the first digital line drawing, wherein the second digital line drawing is a two-tone image and is different from the first digital line drawing; and outputting the second digital line drawing as a line drawing corresponding to the digital image.

20. The non-transitory computer-readable medium of claim 19, wherein the second digital line drawing comprises a set of lines in a first tone and a background in a second tone, and wherein the set of lines are substantially uniform in width.

* * * * *

UNITED STATES PATENT AND TRADEMARK OFFICE
CERTIFICATE OF CORRECTION

| | | |
|---|---|---|
| PATENT NO. | : 10,922,860 B2 | |
| APPLICATION NO. | : 16/410854 | |
| DATED | : February 16, 2021 | |
| INVENTOR(S) | : Brian Price et al. | |

It is certified that error appears in the above-identified patent and that said Letters Patent is hereby corrected as shown below:

On the Title Page

Item (72) Inventors:
Delete "Daicho Ito"
Insert --Daichi Ito--

Signed and Sealed this
Second Day of July, 2024

Katherine Kelly Vidal
*Director of the United States Patent and Trademark Office*